(12) United States Patent
Le et al.

(10) Patent No.: US 10,087,975 B2
(45) Date of Patent: Oct. 2, 2018

(54) EXPANDABLE, RESIN FILLED FASTENER, FASTENER SYSTEM, AND METHOD FOR COMPOSITE STRUCTURES

(71) Applicant: The Boeing Company, Chicago, IL (US)

(72) Inventors: Quynhgiao N. Le, Bellevue, WA (US); Robert B. Greegor, Black Diamond, WA (US); Brent A. Whiting, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 212 days.

(21) Appl. No.: 15/141,643

(22) Filed: Apr. 28, 2016

(65) Prior Publication Data
US 2017/0314606 A1     Nov. 2, 2017

(51) Int. Cl.
*H01R 43/00* (2006.01)
*F16B 39/02* (2006.01)
(Continued)

(52) U.S. Cl.
CPC ........ *F16B 39/021* (2013.01); *B29C 45/1418* (2013.01); *B64D 45/02* (2013.01);
(Continued)

(58) Field of Classification Search
CPC ................ F16B 13/0816; F16B 13/124; F16B 2001/0064; F16B 35/041; F16B 39/021; Y10T 29/49117; Y10T 29/49938
(Continued)

(56) References Cited

U.S. PATENT DOCUMENTS 5,709,356 A * 1/1998 Avenet .................. B64D 45/02
                                                       244/1 A
7,462,008 B2 * 12/2008 Attanasio .................. B64C 1/12
                                                       411/111
(Continued)

FOREIGN PATENT DOCUMENTS

EP          2947015 A1    11/2015

OTHER PUBLICATIONS

Extended European Search Report, dated Oct. 5, 2017, for Counterpart EP Application No. 17167266.0, Applicant The Boeing Company, 7 pages.
(Continued)

*Primary Examiner* — Thiem Phan

(57) ABSTRACT

A fastener for improved electrical contact with a composite structure and improved distribution of electric current to the composite structure. The fastener includes an elongated shaft having a first end with a head portion, a second end with a threaded portion, and a shaft body therebetween. At least one feed channel extends from an opening at the threaded portion, through the shaft body, and terminates proximal to the head portion. The shaft body radially expands upon pressure injection of a resin filler into the feed channel, when the fastener is installed in a corresponding fastener hole formed in the composite structure. Upon radially expanding, the outer surface of the shaft body makes contact with an inner hole surface of the corresponding fastener hole, resulting in the fastener providing electrical contact with the composite structure and providing distribution of electric current.

20 Claims, 14 Drawing Sheets

(51) Int. Cl.
  *B29C 45/14* (2006.01)
  *B64D 45/02* (2006.01)
  *F16B 35/04* (2006.01)
  *B29K 105/16* (2006.01)
  *B29K 505/14* (2006.01)
  *B29K 507/04* (2006.01)
  *B29L 1/00* (2006.01)
  *F16B 1/00* (2006.01)
  *F16B 33/00* (2006.01)

(52) U.S. Cl.
  CPC .. *F16B 35/041* (2013.01); *B29C 2045/14237* (2013.01); *B29K 2105/16* (2013.01); *B29K 2105/162* (2013.01); *B29K 2505/14* (2013.01); *B29K 2507/04* (2013.01); *B29K 2995/0005* (2013.01); *B29L 2001/007* (2013.01); *F16B 33/004* (2013.01); *F16B 2001/0064* (2013.01); *Y10T 29/49117* (2015.01); *Y10T 29/49938* (2015.01)

(58) Field of Classification Search
  USPC ...... 29/825, 458, 509, 510, 517, 522.1, 842; 244/1 A, 132, 218; 411/82.1, 111, 258, 411/333, 353, 378, 418, 929
  See application file for complete search history.

(56) References Cited

U.S. PATENT DOCUMENTS

2012/0152611 A1 6/2012 Fisher et al.
2013/0259604 A1 10/2013 Whitlock et al.

OTHER PUBLICATIONS

Gross et al., "Intermetallic and Composite Metallic Gap Filler", U.S. Appl. No. 14/614,656, filed Feb. 5, 2015, 21 pages.
Nakhjavani et al., "Lightning Damage Resistant Aircraft Skin Fasteners", U.S. Appl. No. 14/684,181, filed Apr. 10, 2015, 22 pages.
Greegor et al., "Conformal Clearance Fit Fastener, Fastener System, and Method for Composite Structures", U.S. Appl. No. 15/087,841, filed Mar. 31, 2016, 80 pages.

* cited by examiner

EXPANDABLE, RESIN FILLED FASTENER, FASTENER SYSTEM, AND METHOD FOR COMPOSITE STRUCTURES

BACKGROUND

1) Field of the Disclosure

The disclosure relates generally to fasteners, fastener systems, and methods for composite structures, and more particularly, to expandable, compliant clearance fit fasteners, fastener systems, and methods that provide improved electrical contact and conductivity with composite structures, such as carbon fiber reinforced plastic (CFRP) structures, such as for use in aircraft.

2) Description of Related Art

Composite structures, such as carbon fiber reinforced plastic (CFRP) structures, may be used in a wide variety of applications, including in the manufacture of aircraft, spacecraft, rotorcraft, watercraft, automobiles, trucks, and other vehicles and structures, due to their high strength-to-weight ratios, corrosion resistance, and other favorable properties. The composite structures, such as CFRP structures, are typically made of a composite material comprising a matrix material, such as a resin, reinforced with fiber material, such as carbon fiber. The resin is not generally electrically conductive, in contrast to the fiber material.

Good electrical contact between composite aircraft wings, fuselage, or other aircraft structures, and metal fasteners, i.e., metal bolts, used to secure parts of such structures together, is important to provide electrical conductivity and current distribution or dissipation, such as in the event of a lightning strike or other electromagnetic effects and electrical events, in order for the electric current from the lightning strike to be distributed or dissipated and conducted to ground across the fastened joints and through the surface of the composite structure. If electrical contact between the metal fasteners and such composite aircraft structures, for example, composite wing skins, is inadequate, the electric current from the lightning strike may not dissipate, may remain in the vicinity of the struck fasteners, and may be conducted into the substructure and possibly a fuel tank in the wing, where unwanted discharge or sparking may occur as the result of electrical arching, and/or hot plasma particles ejected from joints due to decomposition of material systems, leading to a potential ignition source in a fuel environment.

Known systems and methods exist to prevent or mitigate discharge and effects from lightning strikes in aircraft composite wing fuel tanks and other aircraft composite structures. Such known systems and methods include the application of electrically insulating sealants and the use of fastener cap seals to cover metal fasteners in the aircraft composite wing fuel tanks, to contain the discharge in the fastened joint.

However, such known electrically insulating sealants may be heavy, and such known fastener seal caps may be numerous in number, and both may add weight to the aircraft, which may result in reduced performance and increased fuel consumption, and, in turn, may result in increased fuel costs. Moreover, such known electrically insulating sealants and fastener seal caps may be time consuming and labor intensive to apply or install and inspect in the aircraft composite wings and fuel tanks, or other aircraft structures, which, in turn, may result in increased manufacturing and inspection time and increased labor costs.

In addition, known fasteners and fastener systems exist that achieve good electrical contact between composite aircraft structures, such as composite wing skins, and the metal fasteners used to secure such structures, and that reduce the potential for unwanted discharge or sparking in aircraft composite wing fuel tanks. Such known fasteners and fastener systems include the use of interference fit fasteners that employ a corrosion resistant steel (CRES) sleeve through which a tapered titanium bolt is inserted, i.e., sleeved interference fit fasteners. When torque is applied to a collar of the bolt, the sleeve expands, making contact with composite layers of the composite wing skin.

However, such sleeved interference fit fasteners may be expensive and difficult to install, and the CRES sleeves for the interference fit fasteners may add weight to the fastened joints, which may result in increased fuel consumption, and, in turn, may result in increased operating costs. Further, due to the expansion of the fastener sleeve when torque is applied to the bolt collar, any exposed high conductivity carbon fiber tip in drilled holes, in which the fasteners are inserted, may be crushed, damaged, or possibly broken. This may limit the overall electrical connection and may also promote micro-cracks in the fastened joints of the composite structure.

Moreover, to meet fuel seal requirements, such known sleeved interference fit fasteners are typically required to be wet installed, which involves immersing the sleeved interference fit fastener in a polysulfide fuel sealant prior to installation in a fastener hole in a composite structure. Such wet installation results in a thin layer of sealant being present between the fastener sleeve and a surface of the fastener hole, after the fastener is installed into the fastener hole. Although this sealant layer serves its fuel seal purpose, its presence may interfere with and decrease the efficiency of electrical current transfer across a fastener-to-composite structure interface.

Accordingly, there is a need in the art for an improved fastener, fastener system, and method that is inexpensive, simple to install and use, weight saving, and reliable, and that provide advantages over known fastener devices, systems and methods.

SUMMARY

Example implementations of this disclosure provide an improved fastener, fastener system, and method for composite structures, such as carbon fiber reinforced plastic (CFRP) structures. As discussed in the below detailed description, embodiments of the improved fastener, fastener system, and method may provide significant advantages over known fastener devices, systems, and methods.

In one example there is provided a fastener for providing improved electrical contact with a composite structure and improved distribution of electric current to the composite structure. The fastener comprises an elongated shaft having a first end, a second end, and a shaft body disposed between the first end and the second end. The shaft body has an outer surface and an inner surface.

The fastener further comprises a head portion disposed at the first end. The fastener further comprises a threaded portion disposed at the second end. The fastener further comprises at least one feed channel extending from an opening at the threaded portion, through the inner surface of the shaft body, parallel to a longitudinal central axis of the elongated shaft, and terminating at a location proximal to the head portion.

The shaft body is configured to radially expand upon injection, under pressure, of a resin filler into the at least one feed channel, when the fastener is installed in a corresponding fastener hole formed in the composite structure. Further, upon radially expanding, the outer surface of the shaft body is configured to make direct contact with an inner hole surface of the corresponding fastener hole, resulting in the fastener providing electrical contact with the composite structure and providing distribution of electric current to the composite structure.

In another example there is provided a fastener system for providing improved electrical contact with a composite structure and improved distribution of electric current to the composite structure. The fastener system comprises one or more fasteners configured for installation in one or more corresponding fastener holes formed in the composite structure.

Each fastener comprises an elongated shaft having a first end, a second end, and a shaft body disposed between the first end and the second end. The shaft body has an outer surface and an inner surface. The fastener further comprises a head portion disposed at the first end. The fastener further comprises a threaded portion disposed at the second end. The fastener further comprises at least one feed channel extending from an opening at the threaded portion, through the inner surface of the shaft body, parallel to a longitudinal central axis of the elongated shaft, and terminating at a location proximal to the head portion.

The fastener system further comprises an injection tool assembly configured for coupling to each of the one or more fasteners installed in the one or more corresponding fastener holes. The fastener system further comprises a resin filler injected, under pressure, with the injection tool assembly into the at least one feed channel of each fastener to fill up the at least one feed channel to cause the shaft body to radially expand and to make direct contact with an inner hole surface of the corresponding fastener hole, resulting in the fastener providing electrical contact with the composite structure and providing distribution of electric current to the composite structure.

In another example there is provided a method for providing improved electrical contact with a composite structure of an aircraft and improved distribution of electric current to the aircraft. The method comprises the step of installing one or more fasteners into one or more corresponding fastener holes formed in the composite structure.

Each fastener comprises an elongated shaft having a first end with a head portion, a second end with a threaded portion, and a shaft body disposed between the first end and the second end. The shaft body has an outer surface and an inner surface. The fastener further comprises at least one feed channel extending from an opening at the threaded portion, through the inner surface of the shaft body, parallel to a longitudinal central axis of the elongated shaft, and terminating at a location proximal to the head portion.

The method further comprises the step of torquing the one or more fasteners in place in the one or more corresponding fastener holes. The method further comprises the step of injecting, under pressure, a resin filler into the opening at the threaded portion of each fastener, and filling the at least one feed channel with the resin filler to cause the shaft body to radially expand and to make direct contact with an inner hole surface of the corresponding fastener hole.

The method further comprises curing the composite structure with the one or more fasteners installed in the composite structure and filled with the resin filler. The method further comprises the step of providing electrical contact between each fastener and the inner hole surface of each corresponding fastener hole, and providing distribution of the electric current to the aircraft.

The features, functions, and advantages that have been discussed can be achieved independently in various examples of the disclosure or may be combined in yet other examples, further details of which can be seen with reference to the following description and drawings.

BRIEF DESCRIPTION OF THE DRAWINGS

The disclosure can be better understood with reference to the following detailed description taken in conjunction with the accompanying drawings which illustrate examples, but which are not necessarily drawn to scale, wherein.

Each figure shown in this disclosure shows a variation of an aspect of the examples presented, and only differences will be discussed in detail.

DETAILED DESCRIPTION

Disclosed examples will now be described more fully hereinafter with reference to the accompanying drawings, in which some, but not all of the disclosed examples are shown. Indeed, several different examples may be provided and should not be construed as limited to the examples set forth herein. Rather, these examples are provided so that this disclosure will be thorough and fully convey the scope of the disclosure to those skilled in the art.

Now referring to the Figures, in one example there is provided a fastener 10, as shown in FIGS. 1A-2D. FIGS. 1A-1D show one example of the fastener 10, such as in the form of fastener 10a. FIGS. 2A-2D show another example of the fastener 10, such as in the form of fastener 10b. Preferably the fastener 10 (see FIGS. 1A, 2A), such as in the form of fastener 10a (see FIG. 1A) and such as in the form of fastener 10b (see FIG. 2A), comprises a compliant clearance fit fastener 12 (see FIGS. 1A-1B, 2A-2B) that is sleeveless, i.e., does not require an additional metal sleeve. The fastener 10 (see FIGS. 1A, 2A) may be comprised of a metal material, such titanium, aluminum, or another suitable metal, or a metal alloy, such as an alloy of nickel containing chromium and iron that is resistant to corrosion at high temperatures, or a nickel-copper alloy having a high tensile strength and resistance to corrosion, or another suitable metal alloy.

Figures 1A, 1B:
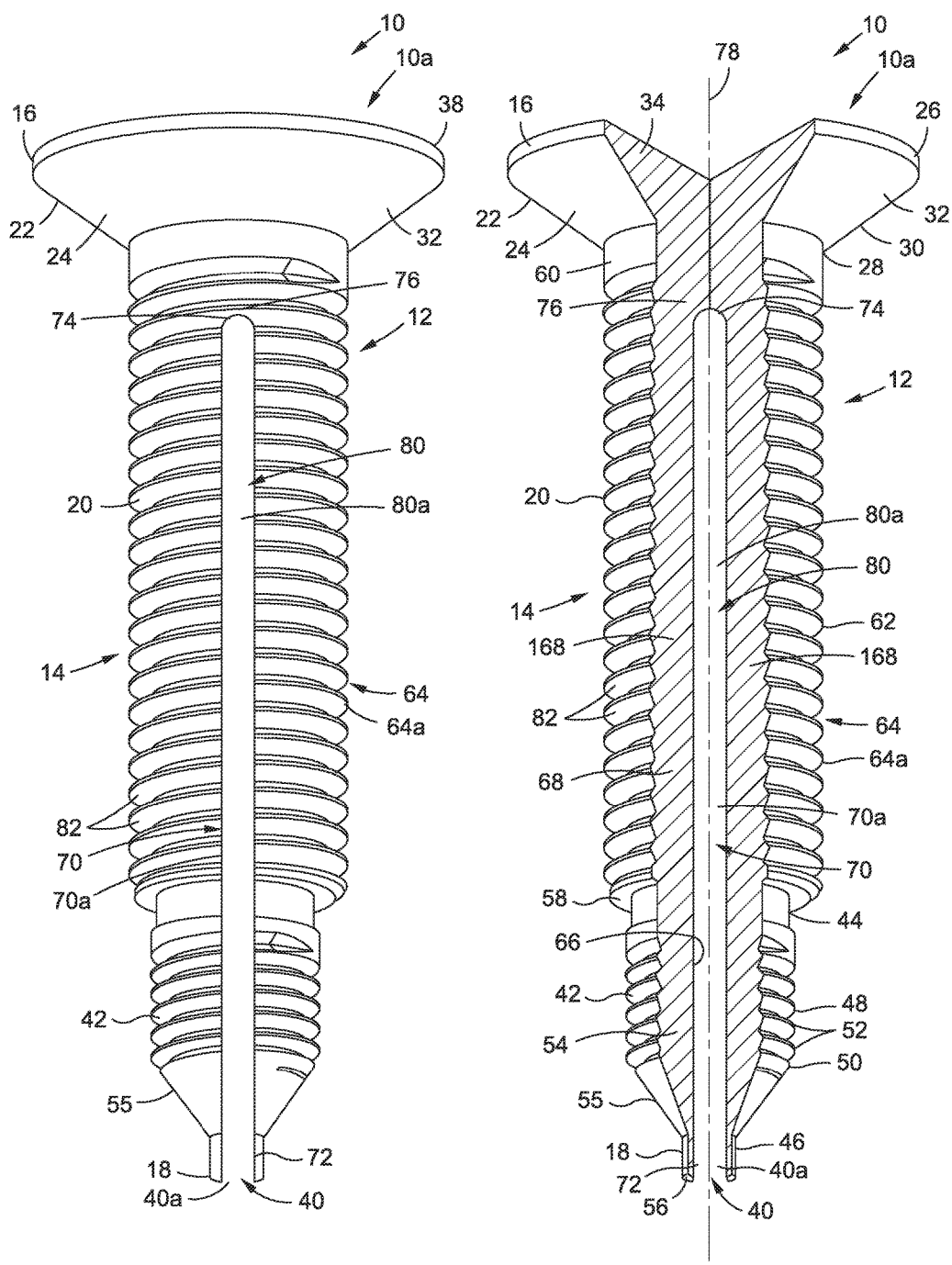
FIG. 1A is an illustration of a side perspective view of an example of a fastener of the disclosure.
FIG. 1B is an illustration of a cutaway side perspective view of the fastener of FIG. 1A.

FIG. 1A is an illustration of a side perspective view of an example of the fastener 10, such as in the form of fastener 10a, of the disclosure. FIG. 1B is an illustration of a cutaway side perspective view of the fastener 10, such as in the form of fastener 10a, of FIG. 1A.

Figures 2A, 2B:
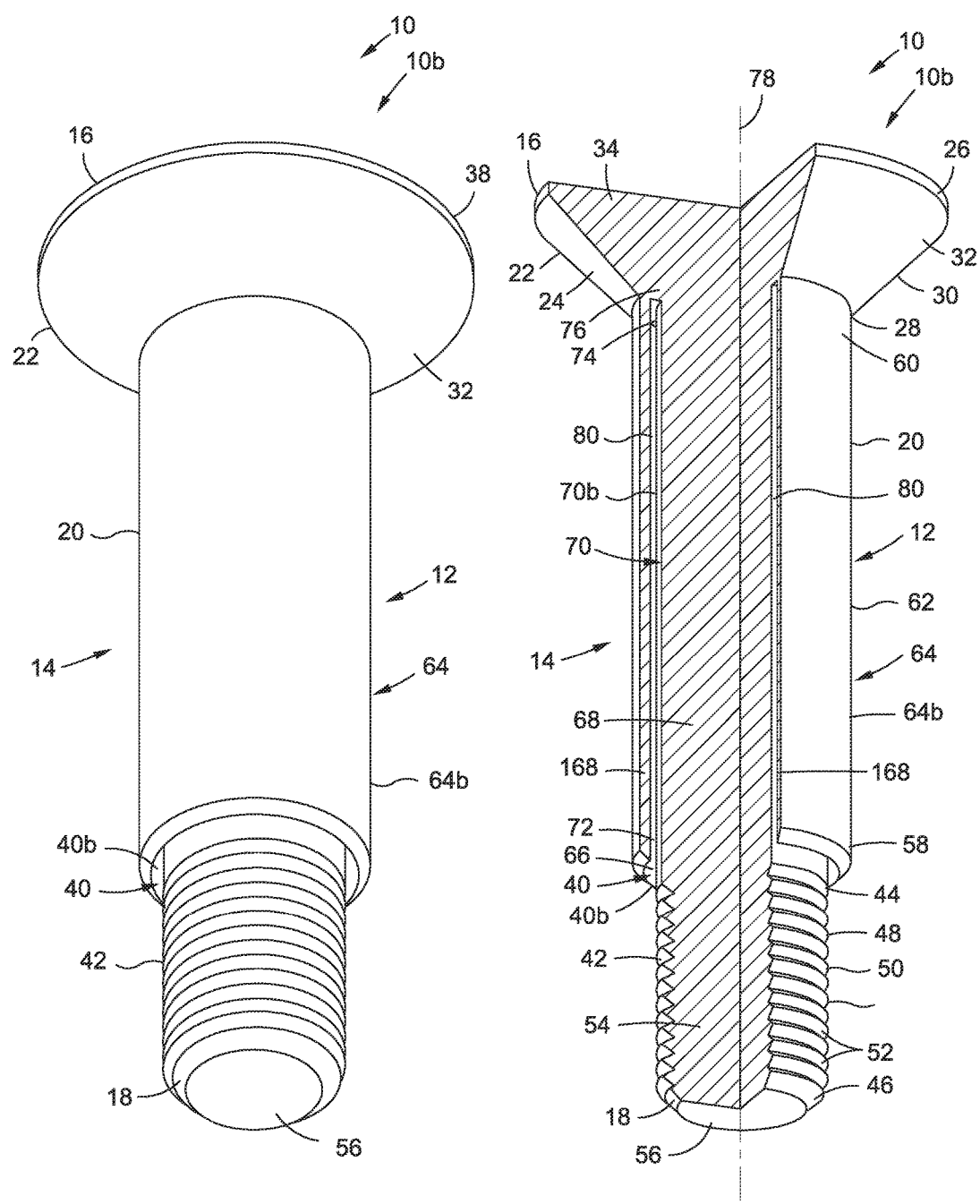
FIG. 2A is an illustration of a side perspective view of another example of a fastener of the disclosure.
FIG. 2B is an illustration of a cutaway side perspective view of the fastener of FIG. 2A.
Figure 2C:
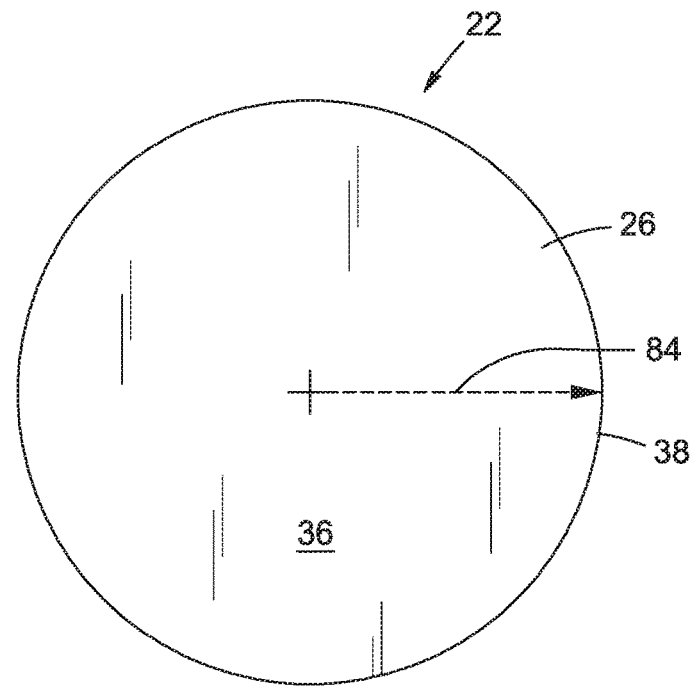
FIG. 2C is an illustration of a top view of the fastener of FIG. 2A.

FIG. 2A is an illustration of a side perspective view of another example of the fastener 10, such as in the form of fastener 10b, of the disclosure. FIG. 2B is an illustration of a cutaway side perspective view of the fastener 10, such as in the form of fastener 10b, of FIG. 2A. FIG. 2E is an illustration of a side perspective view of the fastener 10, such as in the form of fastener 10b, of FIG. 2A, having one or more additional, optional, longitudinal grooves 87.

As shown in FIGS. 1A-1B and 2A-2B, 2E, the fastener 10, such as in the form of fastener 10a (see FIGS. 1A-1B), and such as in the form of fastener 10b (see FIGS. 2A-2B), respectively, has an elongated shaft 14 having a first end 16, a second end 18, and a shaft body 20 disposed between the first end 16 and the second end 18. As further shown in FIGS. 1A-2E, the fastener 10, such as in the form of fastener 10a (see FIGS. 1A-1B), and such as in the form of fastener 10b (see FIGS. 2A-2B, 2E), respectively, has a head portion 22 disposed at the first end 16. The head portion 22 (see FIGS. 1A-1B, 2B) preferably has a frusto-conical shape 24 (see FIGS. 1A-1B, 2B). However, the head portion 22 (see FIGS. 1A, 2A) may have another suitable shape as well. As shown in FIGS. 1B, 2B, the head portion 22 has a top end 26, a bottom end 28, and a central portion 30 with an outer surface 32 (see also FIGS. 1A, 2A) and an interior 34.

Figure 1C:
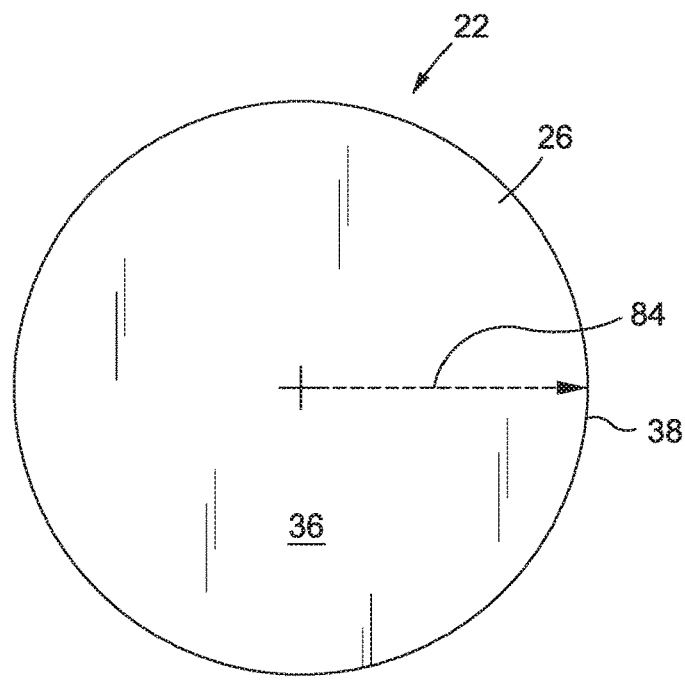
FIG. 1C is an illustration of a top view of the fastener of FIG. 1A.

FIG. 1C is an illustration of a top view of the fastener 10, such as in the form of fastener 10a, of FIG. 1A. FIG. 2C is an illustration of a top view of the fastener 10, such as in the form of fastener 10b, of FIG. 2A. FIGS. 1C and 2C show the top end 26 of the head portion 22 having a top surface 36, which is flat or substantially flat. FIGS. 1C and 2C further show the top end 26 of the head portion 22 having an outer periphery 38 (see also FIGS. 1A, 2A) or perimeter. The fastener 10 (see FIGS. 1A, 2A), such as in the form of fastener 10a (see FIG. 1A), and such as in the form of fastener 10b (see FIG. 2A), has a radial axis 84 (see FIGS. 1C, 2C).

As shown in FIGS. 1A-1B and 2A-2B, 2E, the fastener 10, such as in the form of fastener 10a (see FIGS. 1A-1B), and such as in the form of fastener 10b (see FIGS. 2A-2B, 2E), respectively, further has a threaded portion 42 disposed at the second end 18 of the elongated shaft 14. As shown in FIGS. 1B, 2B, the threaded portion 42 has a top end 44, a bottom end 46, a central portion 48 with an outer surface 50 comprised of a plurality of threads 52, and an interior 54. The threaded portion 42 may be configured to mate with a threaded collar 158 (see FIGS. 5A-5B), a threaded nut, or another suitable threaded element.

In one example, as shown in FIGS. 1A-1B, the fastener 10, such as in the form of fastener 10a, comprises an opening 40, such as a slot opening 40a, at the threaded portion 42. The opening 40 (see FIG. 1B), such as the slot opening 40a (see FIGS. 1A-1B), is preferably formed in a bottom surface 56 (see FIG. 1B) at the bottom end 46 (see FIG. 1B) of the threaded portion 42 (see FIG. 1B). The slot opening 40a (see FIGS. 1A-1B) is preferably a through opening going from one side of the fastener 10 through to the opposite side of the fastener 10. Further, in this example, as shown in FIGS. 1A-1B, the threaded portion 42 has a cone-shaped tip portion 55 formed at the bottom end 46 (see FIG. 1B).

Figure 1D:
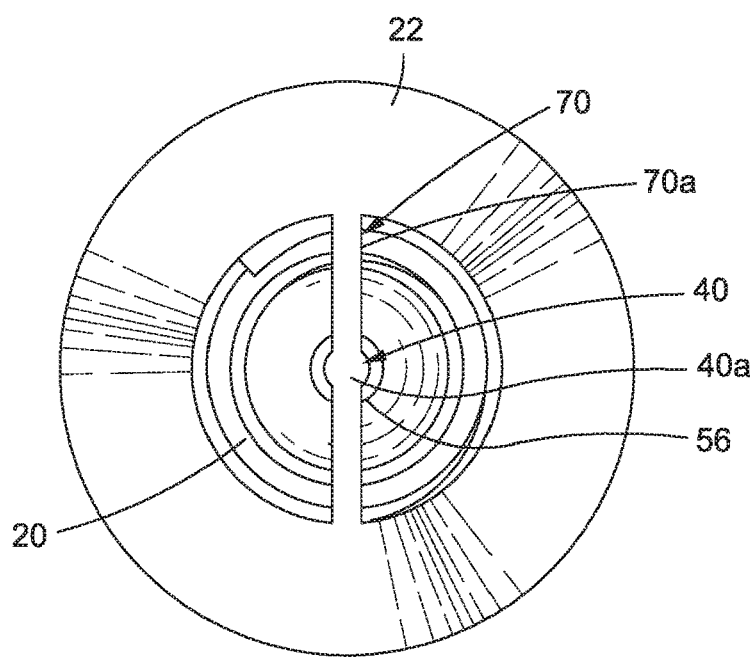
FIG. 1D is an illustration of a bottom view of the fastener of FIG. 1A.

FIG. 1D is an illustration of a bottom view of the fastener 10, such as in the form of fastener 10a, of FIG. 1A. FIG. 1D shows the opening 40, such as the slot opening 40a, formed in the bottom surface 56 (see FIG. 1B), and further shows a feed channel 70, such as in the form of a central feed channel 70a, and further shows the bottom of the shaft body 20 and the head portion 22.

In another example, as shown in FIGS. 2A-2B, the fastener 10, such as in the form of fastener 10b, comprises an opening 40, such as a concentric ring opening 40b, at the threaded portion 42. As further shown in FIGS. 2A-2B, the opening 40, such as the concentric ring opening 40b, is preferably formed at the top end 44 of the threaded portion 42. Further, in this example, as shown in FIGS. 2A-2B, the threaded portion 42 has a bottom surface 56 that is flat or substantially flat at the bottom end 46 (see FIG. 2B).

Figure 2D:
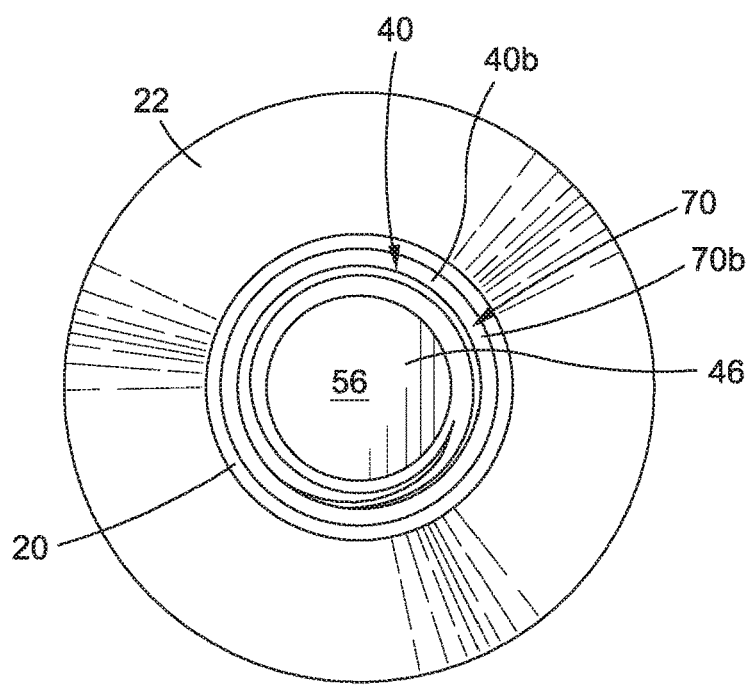
FIG. 2D is an illustration of a bottom view of the fastener of FIG. 2A.
Figures 2E, 2F:
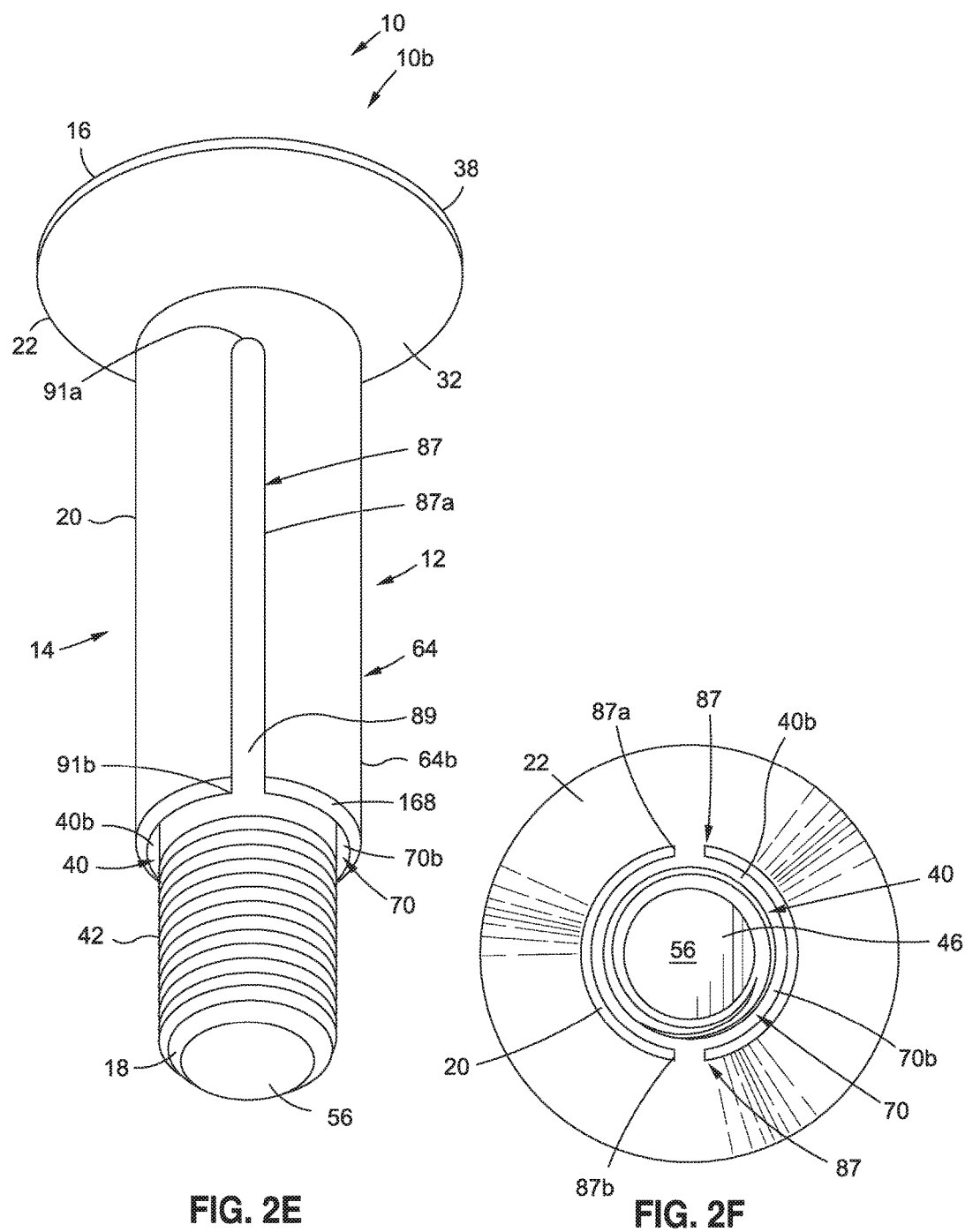
FIG. 2E is an illustration of a side perspective view of the fastener of FIG. 2A having one or more optional longitudinal grooves.
FIG. 2F is an illustration of a bottom view of the fastener of FIG. 2E.

FIG. 2D is an illustration of a bottom view of the fastener 10, such as in the form of fastener 10b, of FIG. 2A. FIG. 2D shows the bottom surface 56 at the bottom end 46, shows the opening 40, such as the concentric ring opening 40b, and shows the bottom of the shaft body 20 and the head portion 22.

As shown in FIGS. 1A-1B and 2A-2B, the fastener 10, such as in the form of fastener 10a (see FIGS. 1A-1B), and such as in the form of fastener 10b (see FIGS. 2A-2B), respectively, further comprises the shaft body 20 having a first end 58 integrally joined, connected, or coupled to the top end 44 of the threaded portion 42, has a second end 60 integrally joined, connected, or coupled to the bottom end 28 of the head portion 22, and has a central portion 62 disposed between the first end 58 and the second end 60.

The shaft body 20 (see FIGS. 1A-1B, 2A-2B, 2E) has an outer surface 64 (see FIGS. 1A-1B, 2A-2B, 2E) and an inner surface 66 (see FIGS. 1B, 2B), and further has an interior 68 (see FIGS. 1B, 2B) and shaft body walls 168 (see FIGS. 1B, 2B, 2E). In one example, as shown in FIGS. 1A-1B, the outer surface 64 of the shaft body 20 comprises a ridged outer surface 64a having a plurality of ridges 82. The plurality of ridges 82 are preferably configured to contact an inner hole surface 86 (see FIGS. 5A-5B) of a corresponding fastener hole 11 (see FIGS. 5A-5B), to provide an electrical interconnection 90 (see FIG. 5B) with a composite structure 102 (see FIG. 5B), and to provide a fuel seal 92 (see FIG. 5B) for a fastened joint 108 (see FIGS. 3A-3C) formed by the fastener 10 (see FIGS. 3B, 3C, 5B) fastened to the composite structure 102 (see FIGS. 3B, 3C, 5B).

In another example, as shown in FIGS. 2A-2B, the outer surface 64 of the shaft body 20 comprises a smooth outer surface 64b. The smooth outer surface 64b (see FIGS. 2A-2B) is preferably smooth, or substantially smooth, and does not have a plurality of ridges 82 (see FIG. 1A). Optionally, as shown in FIG. 2E, the shaft body 20 of the fastener 10, such as in the form of fastener 10b, may further comprise one or more longitudinal grooves 87 extending from the concentric ring opening 40b at the top end 44 of the threaded portion 42, through the outer surface 64, such as the smooth outer surface 64b, of the shaft body, parallel to a longitudinal central axis 78 (see FIG. 2B) of the elongated shaft 14, and terminating proximal to the head portion 22.

FIG. 2F is an illustration of a bottom view of the fastener 10, such as in the form of fastener 10b, of FIG. 2E, showing the longitudinal grooves 87. The one or more longitudinal grooves 87 (see FIGS. 2E-2F) may comprise a first longitudinal groove 87a (see FIGS. 2E-2F) and a second longitudinal groove 87b (see FIG. 2F). Each longitudinal groove 87 (see FIG. 2E) may have a first end 91a (see FIG. 2E) and a second end 91b (see FIG. 2E). As shown in FIG. 2E, the longitudinal groove 87 opens through to a central bore portion 89 of the elongated shaft 14 of the fastener 10, such as in the form of fastener 10b.

FIG. 2F shows the bottom surface 56 at the bottom end 46, shows the opening 40, such as the concentric ring opening 40b, shows a feed channel 70, such as in the form of a concentric ring feed channel 70b, shows the longitudinal grooves 87, and further shows the bottom of the shaft body 20 and the head portion 22.

As shown in FIGS. 1B and 2B, 2E, the fastener 10, such as in the form of fastener 10a (see FIG. 1B), and such as in the form of fastener 10b (see FIG. 2B, 2E), respectively, further has at least one feed channel 70 extending from the opening 40 at the threaded portion 42. In one example as shown in FIG. 1B, the feed channel 70 may be in the form of a central feed channel 70a. In another example as shown in FIGS. 2B, 2E, the feed channel 70 may be in the form of a concentric ring feed channel 70b. The feed channel 70 may also have another suitable form or configuration.

As shown in FIGS. 1B and 2B, the feed channel 70 has a first end 72 and a second end 74. As further shown in FIGS. 1B and 2B, the feed channel 70 extends from the opening 40 at the threaded portion 42, through the inner surface 66 of the shaft body 20, parallel to a longitudinal central axis 78 of the elongated shaft 14, and terminates at a location 76 proximal to the head portion 22. The feed channel 70 (see FIGS. 1B, 2B) extends longitudinally and parallel to the longitudinal central axis 78 (see FIGS. 1B, 2B) of the elongated shaft 14 (see FIGS. 1B, 2B), and the feed channel 70 (see FIGS. 1B, 2B) has an interior 80 (see FIGS. 1B, 2B). As shown in FIG. 1B, the interior 80 may comprise a through interior 80a that opens from one side of the shaft body 20 to the opposite side of the shaft body 20.

As shown in FIG. 1B, the feed channel 70, such as in the form of central feed channel 70a, may be formed longitudinally, continuously, and centrally through the opening 40 at the bottom end 46 of the threaded portion 42, through the interior 54 of the threaded portion 42, through the interior 68 of the shaft body 20, and preferably terminates at the location 76 proximal to or slightly below the bottom end 28 of the head portion 22. The interior 80 (see FIG. 1B) of the feed channel 70 (see FIG. 1B), such as in the form of central feed channel 70a (see FIG. 1B), is preferably hollow and is configured to receive a resin filler 120 (see FIGS. 5A-5B) that is injected, under pressure, into the feed channel 70 (see FIG. 1B).

As shown in FIG. 2B, the feed channel 70, such as in the form of concentric ring feed channel 70b, may be formed longitudinally and continuously through the opening 40 at or near the top end 44 of the threaded portion 42 and the first end 58 of the shaft body 20, through the interior 68 of the shaft body 20, and preferably terminates at the location 76 proximal to or slightly below the bottom end 28 of the head portion 22. The interior 80 (see FIG. 2B) of the feed channel 70 (see FIG. 2B), such as in the form of concentric ring feed channel 70b (see FIG. 2B), is preferably a hollow concentric ring formed in the interior 68 (see FIG. 2B) of the shaft body 20 (see FIG. 2B), and is configured to receive the resin filler 120 (see FIGS. 5A-5B) that is injected, under pressure, into the feed channel 70 (see FIG. 2B).

The shaft body 20 (see FIG. 5B) further has shaft body walls 168 (see FIG. 5B), each having a wall thickness of between about 0.020 inch to about 0.060 inch. For example, the wall thickness of the shaft body walls 168 (see FIGS. 1B, 5B) of the fastener 10, such as fastener 10a (see FIGS. 1B, 5B), may be in a range of between about 0.020 inch and about 0.030 inch. For example, the wall thickness of the shaft body walls 168 (see FIGS. 2B, 2E) of the fastener 10, such as fastener 10b (see FIGS. 2B, 2E), may be in a range of between about 0.040 inch and about 0.060 inch. Electrical conduction may primarily be achieved through the shaft body walls 168 (see FIG. 5B).

The shaft body 20 (see FIGS. 1B, 2B) of the fastener 10 (see FIGS. 1B, 2B), including the shaft body walls 168 (see FIG. 5B), are configured to radially expand upon injection, under pressure, of the resin filler 120 (see FIGS. 3B, 3C, 5A-5B) into the feed channel 70 (see FIGS. 1B, 2B, 2E, 5A-5B), when the fastener 10 (see FIGS. 1B, 2B, 2E, 5A-5B) is installed in a corresponding fastener hole 11 (see FIGS. 3B, 3C, 5A-5B) formed in a composite structure 102 (see FIGS. 3B, 3C, 5A-5B). The shaft body 20 (see FIGS. 1B, 2B, 2E) of the fastener 10 (see FIGS. 1B, 2B, 2E), including the shaft body walls 168 (see FIGS. 1B, 2B, 2E, 5B), may be configured to radially expand a radial distance of from about 0.001 inch to about 0.002 inch radially outward upon injection, under pressure, and filling with the resin filler 120 (see FIG. 5B).

Further, upon radially expanding, the outer surface 64 (see FIGS. 1B, 2B) of the shaft body 20 (see FIGS. 1B, 2B) is configured to make direct contact with an inner hole surface 86 (see FIGS. 5A-5B) of the corresponding fastener hole 11 (see FIGS. 3B, 3C, 5A-5B), resulting in the fastener 10 (see FIGS. 3B, 3C, 5A-5B) providing electrical contact 88 (see FIG. 5B) with the composite structure 102 (see FIG. 5B) and providing distribution of electric current 152 (see FIG. 5B) to the composite structure 102 (see FIGS. 5B, 7), for example, electric current 152 (see FIG. 5B), such as that resulting from a lightning strike 170 (see FIG. 7) or other electromagnetic effects or electrical events. The fastener 10 (see FIGS. 1A, 2A, 3A-3C, 5A-5B) preferably provides improved electrical contact 88 (see FIG. 5B) with the composite structure 102 (see FIGS. 5A-5B) and improved distribution of electric current 152 (see FIG. 5B) to the composite structure 102 (see FIG. 7).

Figure 5A:
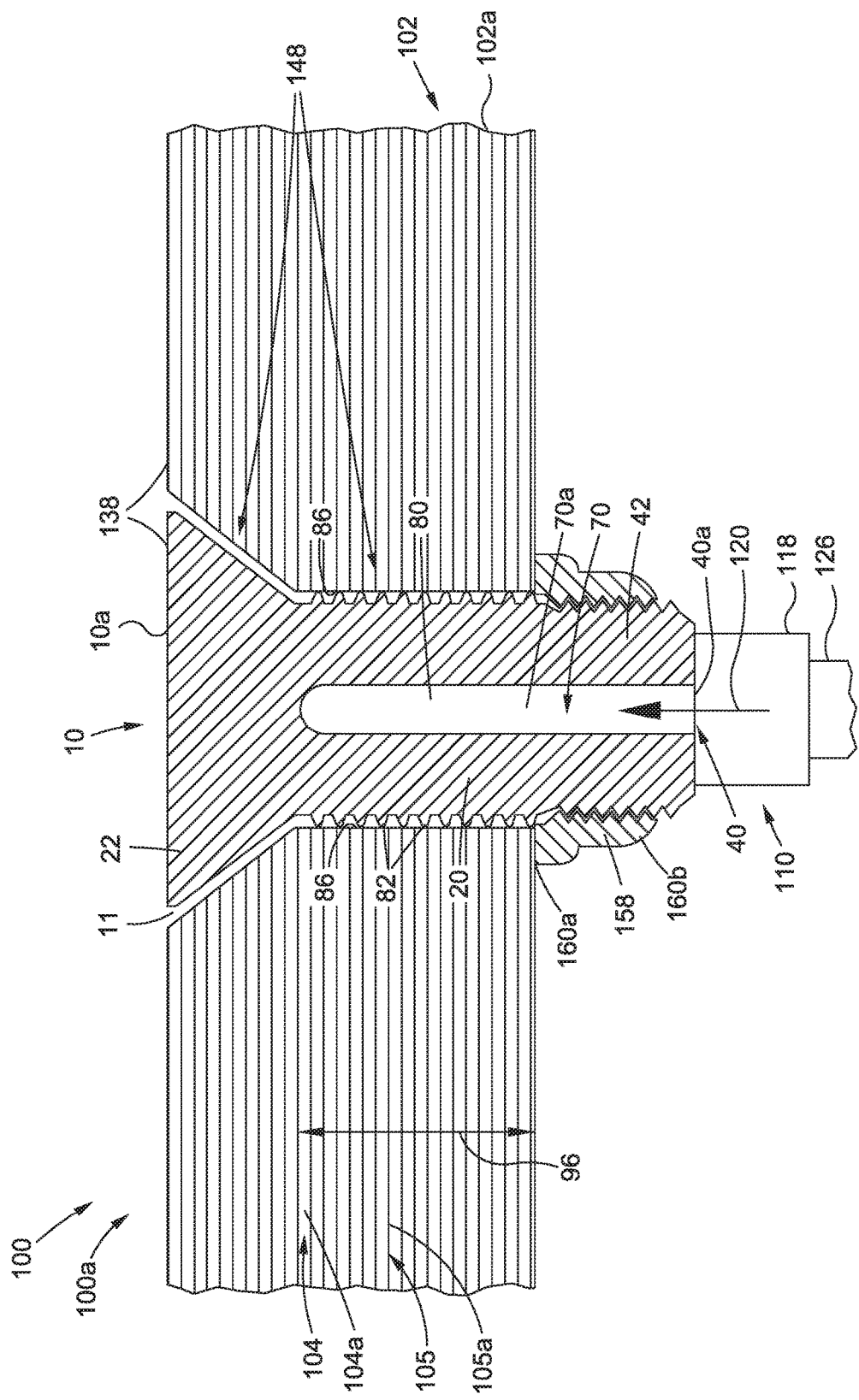
FIG. 5A is a schematic diagram of a partial sectional side view of an example of a fastener system of the disclosure showing the fastener installed in a composite structure and a resin filler injected into the fastener.
Figure 5B:
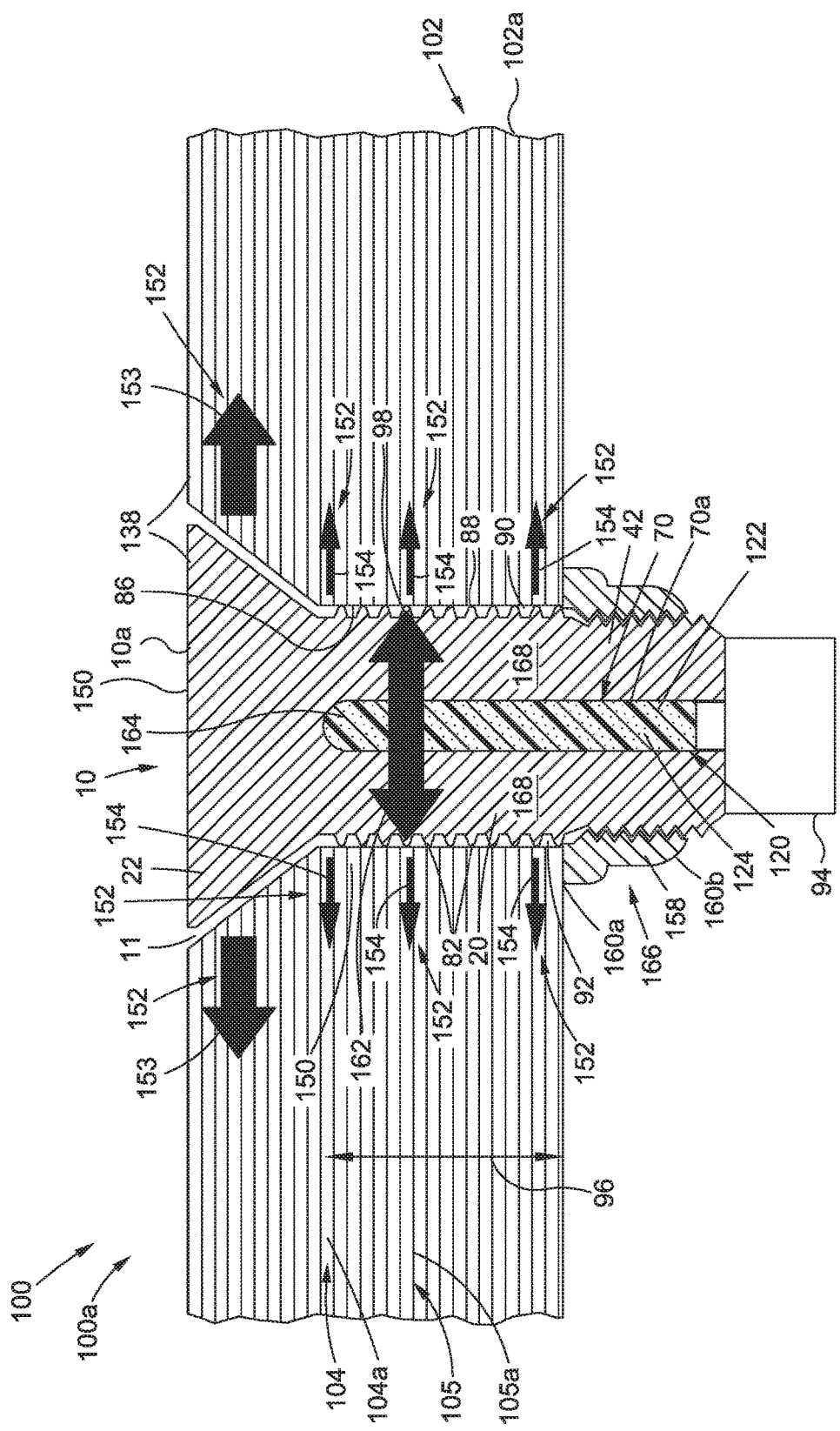
FIG. 5B is a schematic diagram of a partial sectional side view of the fastener system of FIG. 5A showing the fastener filled with the resin filler, and showing radial expansion of the fastener and distribution of electric current.

As shown in FIGS. 1A-1B, 2A-2B, 2E, the fastener 10, such as in the form of fastener 10a (see FIGS. 1A-1B), and such as in the form of fastener 10b (see FIGS. 2A-2B, 2E), comprises a compliant clearance fit fastener 12, that when used with the resin filler 120 (see FIGS. 5A-5B) that causes the shaft body 20 (see FIGS. 5A-5B) to radially expand, results in the head portion 22 (see FIGS. 5A-5B) and the shaft body 20 (see FIG. 5B) both having an interference fit 150 (see FIG. 5B), or effective interference fit, with the inner hole surface 86 (see FIG. 5B) of the corresponding fastener hole 11 (see FIG. 5B).

Figure 3A:
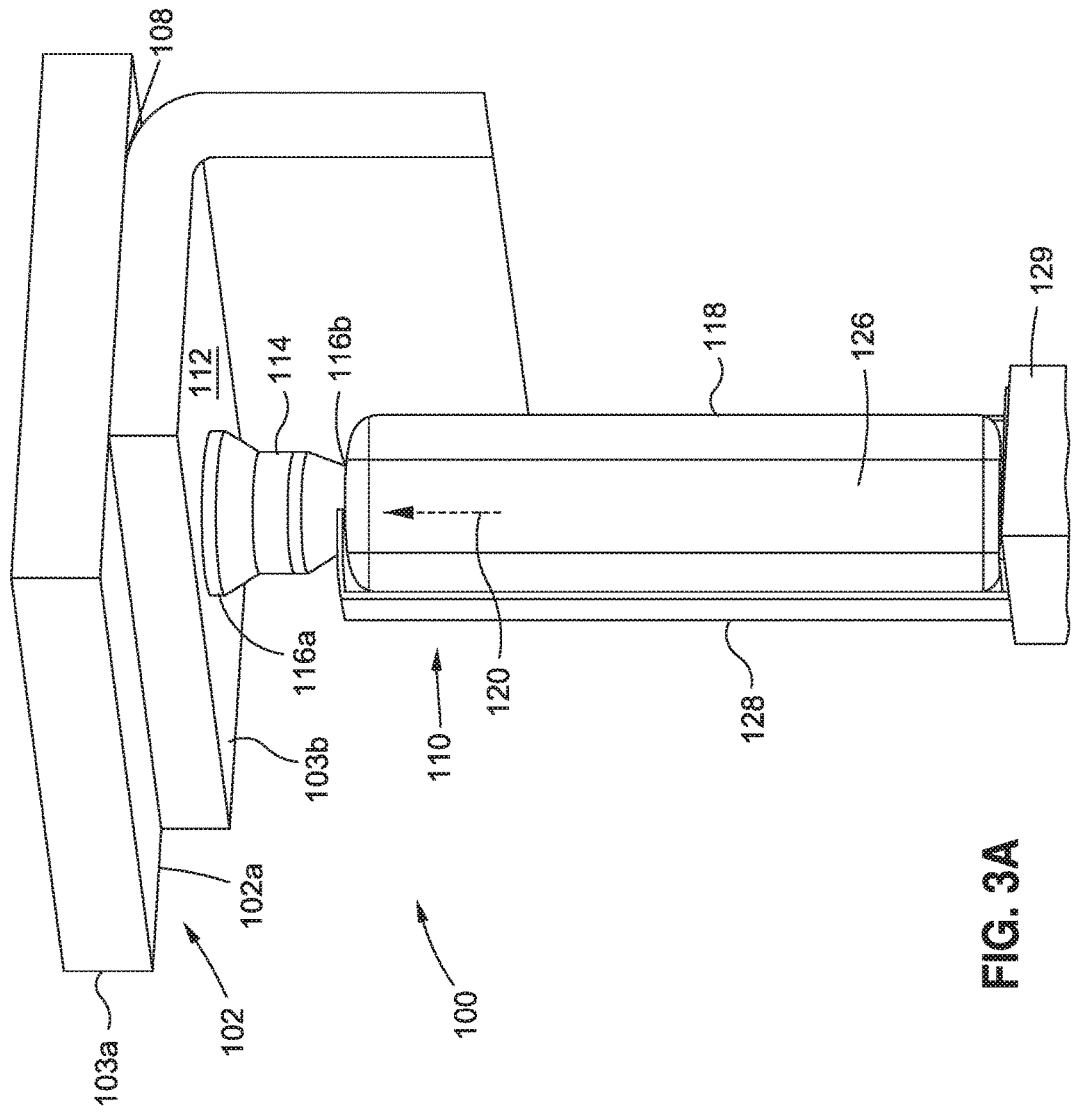
FIG. 3A is an illustration of a partial cutaway side perspective view of a fastener system of the disclosure.
Figure 3B:
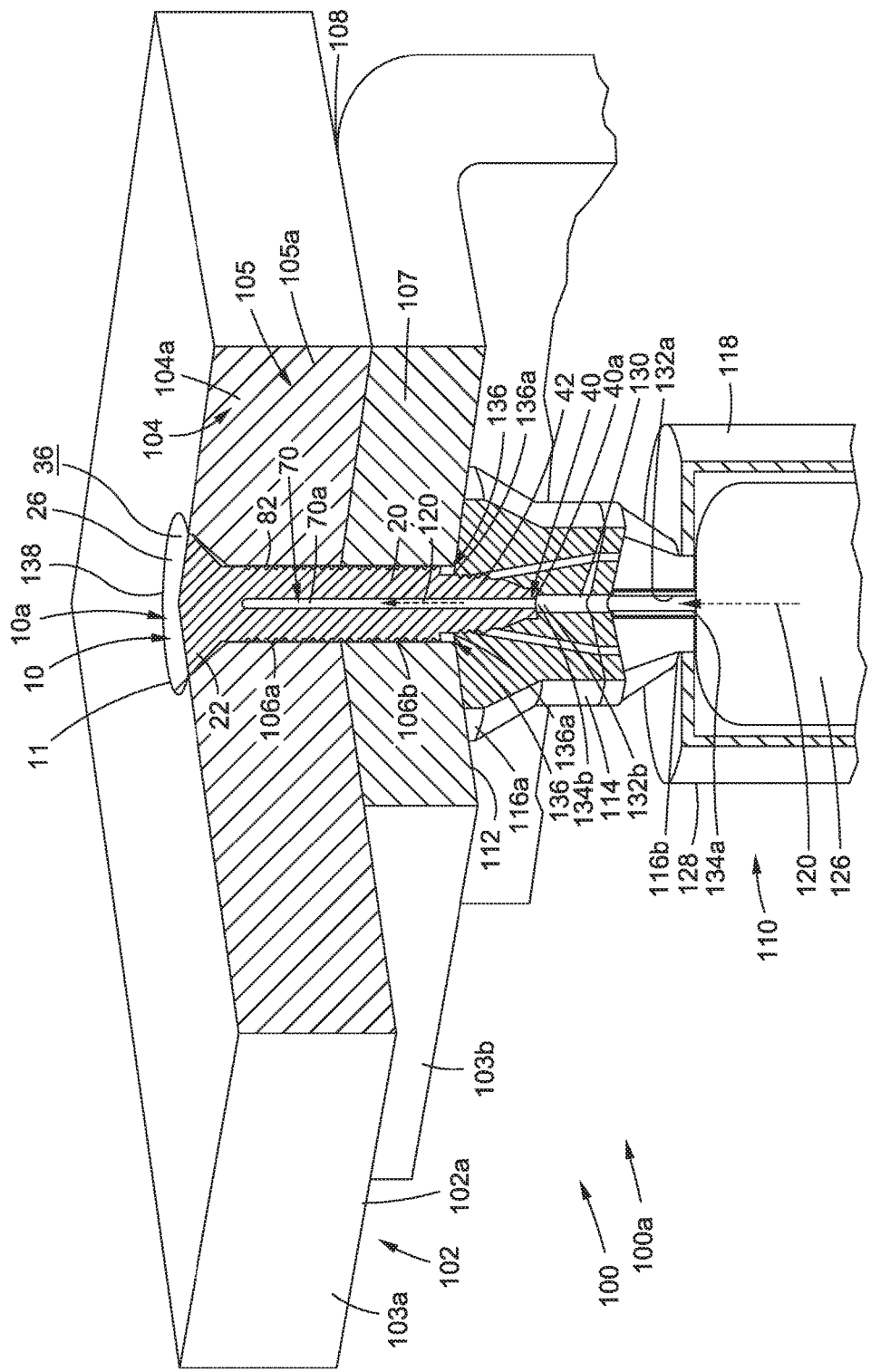
FIG. 3B is an illustration of a cutaway side perspective view of an example of a fastener system shown with the fastener of FIG. 1A.
Figure 3C:
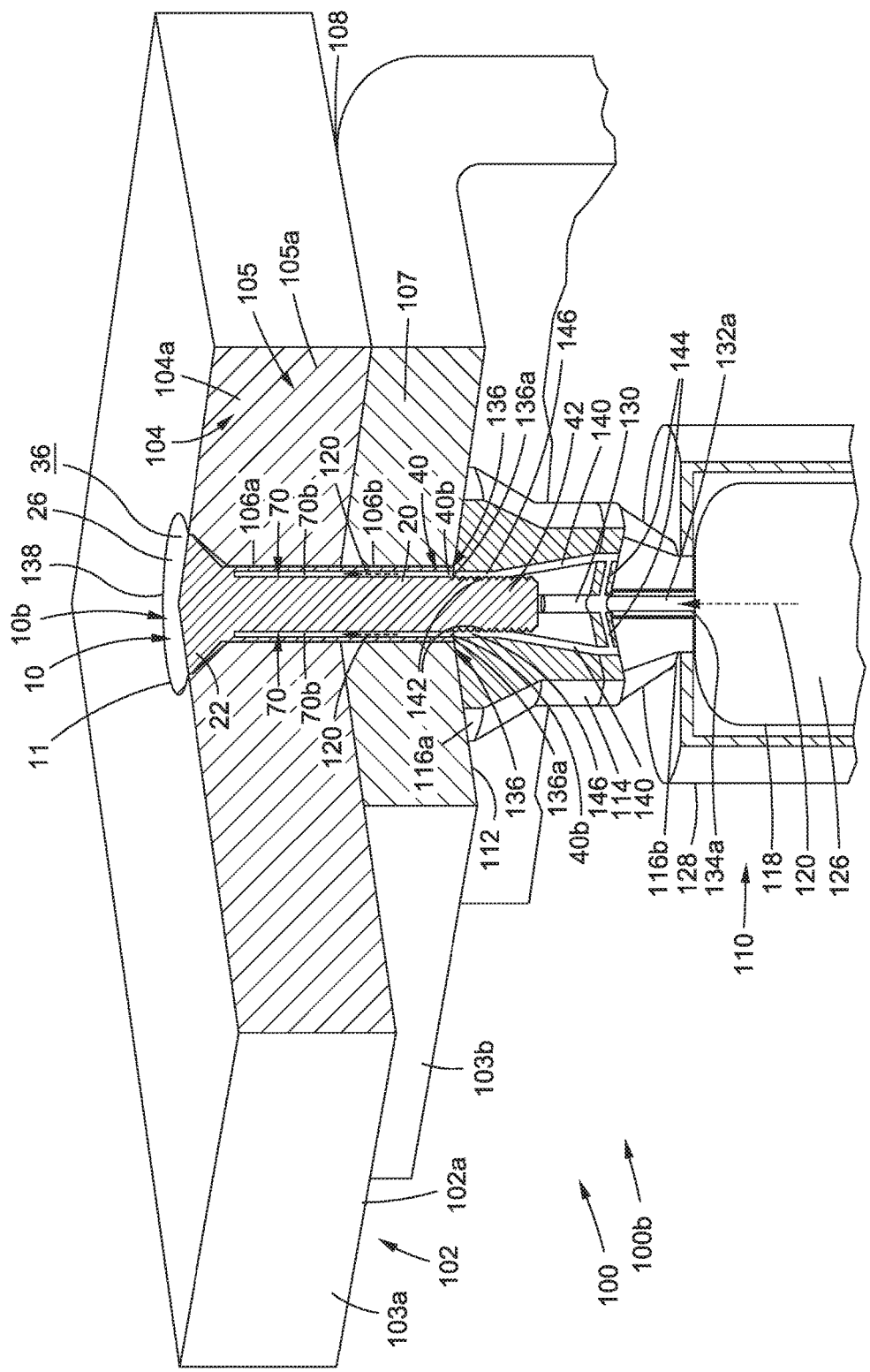
FIG. 3C is an illustration of a cutaway side perspective view another example of a fastener system shown with the fastener of FIG. 2A.

Now referring to FIGS. 3A-3C, in another example, there is provided a fastener system 100. FIG. 3A is an illustration of a partial cutaway side perspective view of the fastener system 100 of the disclosure. FIG. 3B is an illustration of a cutaway side perspective view of an example of a fastener system 100, such as in the form of fastener system 100a, shown with the fastener 10a of FIG. 1A. FIG. 3C is an illustration of a cutaway side perspective view another example of a fastener system 100, such as in the form of fastener system 100b, of the fastener system 100 of FIG. 3A shown with the fastener 10b of FIG. 2A. The fastener system 100 (see FIGS. 3A-3C, 5A-5B) provides for improved electrical contact 88 (see FIG. 5B) with the composite structure 102 (see FIGS. 3A-3C), and improved distribution of electric current 152 (see FIG. 5B) to the composite structure 102 (see FIG. 7), such as an aircraft composite structure 102b (see FIG. 7), and for example, electric current 152 (see FIG. 5B) such as that resulting from a lightning strike 170 (see FIG. 7) or other electromagnetic effects or electrical events.

The fastener system 100 (see FIGS. 3B, 3C) comprises one or more fasteners 10 (see FIGS. 3B, 3C), such as in the form of fastener 10a (see FIG. 3B), and such as in the form of fastener 10b (see FIG. 3C), as discussed above in detail above. The one or more fasteners 10 (see FIGS. 3B, 3C), are each configured for installation into and within one or more corresponding fastener holes 11 (see FIGS. 3B, 3C) formed in the composite structure 102 (see FIGS. 3A-3C), such as a carbon fiber reinforced plastic (CFRP) structure 102a (see FIGS. 3A-3C). The fastener 10 (see FIGS. 3B, 3C) is configured to be filled with a resin filler 120 (see FIGS. 3B, 3C).

FIGS. 3B and 3C show the fastener 10 inserted into the corresponding fastener hole 11 in the composite structure 102, such as in the form of the carbon fiber reinforced plastic (CFRP) structure 102a. The top surface 36 (see FIGS. 3B, 3C) of the top end 26 (see FIGS. 3B, 3C) of the head portion 22 (see FIGS. 3B, 3C) of the fastener 10 (see FIGS. 3B, 3C) is shown in a countersink position 138 (see FIGS. 3B, 3C).

As used herein, "carbon fiber reinforced plastic (CFRP)" means a composite material made of a matrix material 104 (see FIGS. 3B, 3C), such as a resin matrix 104a (see FIGS. 3B, 3C) reinforced with a plurality of fibers 105 (see FIGS. 3B, 3C), such as carbon fibers 105a (see FIGS. 3B, 3C), or a combination of carbon fibers 105a and other reinforcing fibers, such as glass fibers, aramid fibers, graphite fibers, aromatic polyamide fiber, fiberglass, aluminum fibers, or other suitable reinforcing fibers. The matrix material 104 (see FIGS. 3B, 3C), such as the resin matrix 104a (see FIGS. 3B, 3C) of the CFRP preferably comprises a polymer resin comprising thermoset polymer resins or thermoplastic polymer resins. Exemplary thermoset polymer resins that may be used include epoxy resins, polyester resins, phenolic resins, vinyl ester resins, allyl resins, bismaleimide (BMI) resins, polyurethane (PUR) resins, cyanate ester resins, polyimide resins, or other suitable thermoset polymer resins or resin systems. Exemplary thermoplastic polymer resins that may be used include polyethylene (PE) resins, vinyl resins, polyproplyene (PP) resins, polyamide resins including nylon resins, polycarbonate resins, polyethylene terephthalate (PET) resins, polyetheretherketone polymer (PEEK) resins, polyetherketoneketone polymer (PEKK) resins, polyethersulfone (PES) resins, polysulfone (PSU) resins, polyphenylene sulfide (PPS) resins, polytetrafluoroethylene (PTFE) resins, or other suitable thermoplastic polymer resins or resin systems.

As shown in FIGS. 3A-3C, the composite structure 102 comprises a first part 103a and a second part 103b. As shown in FIGS. 3B, 3C, the first part 103a may be constructed of composite material, including the matrix material 104, such as the resin matrix 104a, and the plurality of fibers 105, such as carbon fibers 105a. It is noted that the matrix material 104, such as the resin matrix 104a, and the plurality of fibers 105, such as the carbon fibers 105a, are only schematically represented in FIGS. 3B, 3C, as well as FIGS. 5A-5B. The plurality of fibers 105 (see FIGS. 3B, 3C, 5A-5B) extend through the matrix material 104 (see FIGS. 3B, 3C, 5A-5B) and are positioned throughout the composite structure 102 (see FIGS. 3B, 3C, 5A-5B), extending in a length direction, a width direction, or a combination of these directions, such as 0, 90, +/−45 degree orientations, and layered in a thickness direction of the composite structure 102 (see FIGS. 3B, 3C, 5A-5B).

The second part 103b (see FIGS. 3B, 3C) may comprise a metallic structure 107 (see FIGS. 3B, 3C) made of a metal material, such as aluminum, or another suitable metal material, and fastened or attached to the first part 103a (see FIGS. 3B, 3C) of the composite structure 102 (see FIGS. 3B, 3C). Alternatively, the first part 103a (see FIGS. 3A-3C) may comprise a metallic structure made of a metal material, and the second part 103b (see FIGS. 3A-3C) may comprise a composite material.

As shown in FIGS. 3B and 3C, the first part 103a has an interior opening 106a through which the fastener 10 is inserted, and the second part 103b has an interior opening 106b through which the fastener 10 is also inserted. The fastener 10 (see FIGS. 3B, 3C) attaches or joins the first part 103a (see FIGS. 3C, 3B) to the second part 103b (see FIGS. 3B, 3C) to form a fastened joint 108 (see FIGS. 3A-3C).

As discussed above, each fastener 10 (see FIGS. 1B, 2B, 3B, 3C) of the fastener system 100 (see FIGS. 3B, 3C) comprises an elongated shaft 14 (see FIGS. 1B, 2B) having a first end 16 (see FIGS. 1B, 2B) with the head portion 22 (see FIGS. 1B, 2B, 3B, 3C) disposed at the first end 16, a second end 18 (see FIGS. 1B, 2B) with the threaded portion 42 (see FIGS. 1B, 2B, 3B, 3C) disposed at the second end 18, and the shaft body 20 (see FIGS. 1B, 2B, 3B, 3C) disposed between the first end 16 (see FIGS. 1B, 2B) and the second end 18 (see FIGS. 1B, 2B). The shaft body 20 (see FIGS. 1B, 2B) has an outer surface 64 (see FIGS. 1B, 2B) and an inner surface 66 (see FIGS. 1B, 2B).

Each fastener 10 (see FIGS. 1B, 2B, 3B, 3C) of the fastener system 100 (see FIGS. 3B, 3C) further comprises, as discussed above, at least one feed channel 70 (see FIGS. 1B, 2B, 3B, 3C) extending from an opening 40 (see FIGS. 1B, 2B, 3B, 3C) at the threaded portion 42 (see FIGS. 1B, 2B, 3B, 3C), through the inner surface 66 (see FIGS. 1B, 2B) of the shaft body 20 (see FIGS. 1B, 2B, 3B, 3C), parallel to a longitudinal central axis 78 (see FIGS. 1B, 2B) of the elongated shaft 14 (see FIGS. 1B, 2B), and terminating at a location 76 (see FIGS. 1B, 2B) proximal to the head portion 22 (see FIGS. 1B, 2B). In one example, the opening 40 (see FIGS. 1B, 3B) at the threaded portion 42 (see FIGS. 1B, 3B)

comprises a slot opening 40a (see FIGS. 1B, 3B) at the bottom end 46 (see FIG. 1B) of the threaded portion 42 (see FIGS. 1B, 3B) and is open from one side of the fastener 10 to the opposite side of the fastener 10. In another example, the opening 40 (see FIGS. 2B, 3C) at the threaded portion 42 (see FIGS. 2B, 3C) comprises a concentric ring opening 40b (see FIGS. 2B, 3C) at the top end 44 (see FIG. 2B) of the threaded portion 42 (see FIGS. 2B, 3C). Optionally, as shown in FIG. 2E, one or more longitudinal grooves 87 may be formed in the shaft body 20 and may extend from the concentric ring opening 40b, along the outer surface 64 of the shaft body 20, and terminate proximal to the head portion 22.

As shown in FIGS. 3A-3C, the fastener system 100 further comprises an injection tool assembly 110 configured for coupling to each of the one or more fasteners 10, such as in the form of fastener 10a (see FIG. 3B), and such as in the form of fastener 10b (see FIG. 3C), installed in the one or more corresponding fastener holes 11. As shown in FIGS. 3A-3C, the injection tool assembly 110 is coupled to a bottom surface 112 of the second part 103b of the composite structure 102. As shown in FIGS. 3B, 3C, the injection tool assembly 110 is coupled to the threaded portion 42 of the fastener 10.

The injection tool assembly 110 (see FIGS. 3A-3C) comprises one or more attachment portions 114 (see FIGS. 3A-3C), such as in the form of suction cups or other suitable attachment element, for attachment to the bottom surface 112 (see FIGS. 3A-3C) of the composite structure 102 (see FIGS. 3A-3C). The attachment portion 114 (see FIGS. 3A-3C) has a first end 116a (see FIGS. 3A-3C) attached to the bottom surface 112 (see FIGS. 3A-3C) of the second part 103b (see FIGS. 3A-3C) of the composite structure 102 (see FIGS. 3A-3C), and has a second end 116b (see FIGS. 3A-3C).

As shown in FIGS. 3A-3C, the attachment portion 114 is coupled to a vessel 118 with a pressure injector 126 that preferably contains the resin filler 120 (see FIGS. 3B, 3C) for injection into the feed channel 70 (see FIGS. 3B, 3C) of the fastener 10 (see FIGS. 3B, 3C). As further shown in FIGS. 3A-3C, the vessel 118 is coupled to, and held in place with, a holder assembly 128. The vessel 118 (see FIG. 3A) with the pressure injector 126 (see FIG. 3A) may be coupled or attached to a pressure assembly 129 (see FIG. 3A) that provides pressure and power for injection of the resin filler 120 into the fastener 10.

The vessel 118 (see FIGS. 3B, 3C) is preferably configured for coupling, via the attachment portion 114 (see FIGS. 3B, 3C), to the opening 40 (see FIGS. 3B, 3C) at the threaded portion 42 (see FIGS. 3B, 3C) of the fastener 10 (see FIGS. 3B, 3C). The pressure injector 126 (see FIGS. 3B, 3C) is preferably coupled to the opening 40 (see FIGS. 3B, 3C) at the threaded portion 42 (see FIGS. 3B, 3C) of the fastener 10 (see FIGS. 3B, 3C), and is configured to inject the resin filler 120 (see FIGS. 3B, 3C), under pressure, into the fastener 10 (see FIGS. 3B, 3C).

As further shown in FIGS. 3B and 3C, the injection tool assembly 110 may have one or more seal elements 136, such as in the form of O-ring pressure seals 136a, attached or coupled to the first end 116a of the attachment portion 114. The seal elements 136 (see FIGS. 3B, 3C), such as in the form of high temperature O-ring pressure seals 136a (see FIGS. 3B, 3C), preferably pressure seal the first end 116a (see FIGS. 3B, 3C) of the attachment portion 114 (see FIGS. 3B, 3C) against the bottom surface 112 (see FIGS. 3B, 3C) of the composite structure 102 (see FIGS. 3B, 3C).

As further shown in FIGS. 3B and 3C, the pressure injector 126 preferably comprises a hollow injection tube 130 having a first end 132a with a first end opening 134a configured for injection of the resin filler 120 into the hollow injection tube 130. In one example, as shown in FIG. 3B, the hollow injection tube 130 has a second end 132b with a second end opening 134b configured for alignment with and coupling to the opening 40, such as the slot opening 40a, at the threaded portion 42 of the fastener 10, such as in the form of fastener 10a. In this example, as shown in FIG. 3B, the injection tool assembly 110 of the fastener system 100, such as in the form of fastener system 100a, injects or pumps, under pressure, the resin filler 120 up into the feed channel 70, such as the central feed channel 70a, of the fastener 10, such as in the form of fastener 10a, in order to fill the feed channel 70, such as the central feed channel 70a, with the resin filler 120.

In another example, as shown in FIG. 3C, the hollow injection tube 130 may be configured to connect to a feed channel assembly 140 formed at one or more interior portions 142 of the attachment portion 114. As shown in FIG. 3C, the feed channel assembly 140 may comprise two or more lateral channels 144, each lateral channel 144 coupled at one end to the hollow injection tube 130, and each lateral channel 144 coupled at the other end to a concentric ring channel 146. The concentric ring channel 146 (see FIG. 3C) is configured for alignment with and coupling to the opening 40 (see FIG. 3C), such as the concentric ring opening 40b (see FIG. 3C), at the top end 44 (see FIG. 2B) of the threaded portion 42 (see FIG. 3C) of the fastener 10 (see FIG. 3C), such as in the form of fastener 10b (see FIG. 3C). In this example, as shown in FIG. 3C, the injection tool assembly 110 of the fastener system 100, such as in the form of fastener system 100b, injects or pumps, under pressure, the resin filler 120 up into the feed channel 70, such as the concentric ring feed channel 70b, of the fastener 10, such as in the form of fastener 10b, in order to fill the feed channel 70, such as the concentric ring feed channel 70b, with the resin filler 120.

The fastener system 100 (see FIGS. 3B, 3C) further comprises the resin filler 120 (see FIGS. 3B, 3C) injected via the injection tool assembly 110 (see FIGS. 3B, 3C) into each fastener 10 (see FIGS. 3B, 3C) installed in the composite structure 102 (see FIGS. 3B, 3C). The resin filler 120 (see FIGS. 3B, 3C) is preferably formulated to achieve an effective viscosity level for dispensing into the feed channel 70 (see FIGS. 3B, 3C) of the fastener 10 (see FIGS. 3B, 3C), yet preferably not in a free flowing liquid state.

The resin filler 120 (see FIGS. 3B, 3C, 5A-5B) preferably comprises a resin material 122 (see FIG. 5B), such as a binding resin material or resin system, mixed with, filled with, or containing a filler material 124 (see FIG. 5B), such as a conductive additive or filler, that is electrically conductive, or such as a nonconductive material. The resin material 122 (see FIG. 5B) may comprise a polymer resin comprising thermoset polymer resins or thermoplastic polymer resins. Exemplary thermoset polymer resins that may be used include epoxy resins, polyester resins, phenolic resins, vinyl ester resins, allyl resins, bismaleimide (BMI) resins, polyurethane (PUR) resins, cyanate ester resins, polyimide resins, or other suitable thermoset polymer resins or resin systems. Exemplary thermoplastic polymer resins that may be used include polyethylene (PE) resins, vinyl resins, polyproplyene (PP) resins, polyamide resins including nylon resins, polycarbonate resins, polyethylene terephthalate (PET) resins, polyetheretherketone polymer (PEEK) resins, polyetherketoneketone polymer (PEKK) resins, polyethersulfone (PES) resins, polysulfone (PSU) resins, polyphenylene sulfide (PPS) resins, polytetrafluoroethylene (PTFE) resins, or other suitable thermoplastic polymer resins or resin systems. Exemplary resin materials 122 (see FIG. 5B), or binding resin materials or resin systems, for the resin filler 120 (see FIG. 5B) comprise epoxy resins, bismaleimide (BMI) resins, phenolic resins, and cyanate ester resins.

The filler material 124 (see FIG. 5B) may comprise, for example, chopped carbon fibers; carbon nanotubes; carbon nanofibers; carbon black; metallic fibers; metallic particles including silver particles, nickel particles, copper particles, and aluminum particles; graphite; graphene; graphene nanofillers; or other suitable conductive materials or nonconductive materials. Additionally, the filler material 124 (see FIG. 5B) may comprise conductive polymers, such as poly(3,4-ethylenedioxythiophene) polystyrene sulfonate (PEDOT/PSS), polyaniline, polypyrrole, polyacetylene, polythiophene, or other suitable conductive polymers. As used herein, "conductive polymer", also referred to as "intrinsically conducting polymer", means an organic polymer capable of conducting electricity. Exemplary filler materials 124 (see FIG. 5B) for the resin filler 120 (see FIG. 5B) comprise carbon nanotubes, chopped carbon fibers, silver particles, and the conductive polymer poly(3,4-ethylenedioxythiophene) polystyrene sulfonate (PEDOT/PSS).

Exemplary resin fillers 120 (see FIGS. 3B, 3C, 5A-5B) comprise an epoxy resin doped with silver particles; a bismaleimide (BMI) resin doped with silver particles; a phenolic resin doped with silver particles; a cyanate ester resin doped with silver particles; an epoxy resin doped with carbon nanotubes; a bismaleimide (BMI) resin doped with carbon nanotubes; a phenolic resin doped with carbon nanotubes; a cyanate ester resin doped with carbon nanotubes; an epoxy resin with chopped carbon fibers; a bismaleimide (BMI) resin with chopped carbon fibers; a phenolic resin with chopped carbon fibers; a cyanate ester resin with chopped carbon fibers; and a resin with poly(3,4-ethylenedioxythiophene) polystyrene sulfonate (PEDOT/PSS). As used herein, "doped" means mixed with, filled with, or containing, i.e., the resin is mixed with, filled with, or contains conductive material or additives, such as silver particles, carbon nanotubes, or chopped carbon fibers, to provide conductivity, such as electrical conductivity, or is mixed with, filled with, or contains nonconductive material.

Preferably, the resin material 122 (see FIG. 5B), or resin system, of the resin filler 120 (see FIG. 5B) has similar chemical properties, structural properties, and expansion characteristics as the fastener 10 (see FIGS. 1A, 2A, 5A-5B) into which the resin material 122 (see FIG. 5B) is inserted or injected.

The resin filler 120 (see FIGS. 3B, 3C, 5A-5B) may have a conductivity, such as an electrical conductivity, of approximately $1 \times 10^4$ S/m (siemens per meter) or greater. As used herein, "conductivity" and "electrical conductivity" mean the resin filler's ability to conduct an electric current. Preferably, the conductivity, such as the electrical conductivity, of the resin filler 120 (see FIGS. 3B, 3C, 5A-5B) approaches the conductivity, such as the electrical conductivity, of the composite material of the composite structure 102 (see FIGS. 5A-5B), along the direction of the carbon fibers 105a (see FIGS. 5A-5B) of the composite material comprising the composite structure 102 (see FIGS. 3B, 3C, 5A-5B).

Preferably, the resin filler 120 (see FIGS. 3B, 3C, 5A-5B) is selected so that a coefficient of thermal expansion (CTE) of the resin filler 120 (see FIGS. 3B, 3C, 5A-5B) substantially matches or matches a coefficient of thermal expansion (CTE) of the fastener 10 (see FIGS. 3B, 3C, 5A-5B). As used herein, the "coefficient of thermal expansion (CTE)" means a change in length or volume (e.g., linear thermal expansion in inches) of a material for a unit change in temperature (e.g., per degree Fahrenheit or Celsius), and is used to determine the rate at which a material expands as a function of temperature, and may be used to determine if thermal stress issues may occur. Polymeric plastics tend to expand and contract anywhere from six (6) to nine (9) times more than metals, and differences in CTE between adjacent materials may lead to internal stresses and stress concentrations in the polymer, which may cause premature micro-cracking to occur. Thus, the resin filler 120 (see FIGS. 3B, 3C, 5A-5B) is preferably selected so that the CTE of the resin filler 120 (see FIGS. 3B, 3C, 5A-5B) substantially matches or matches the CTE of the fastener 10 (see FIGS. 1A, 2A, 5A-5B), so that internal stress is not generated in the typical ground to altitude temperature variations that are typically experienced in aircraft 200a (see FIG. 7) and that could lead to micro-cracks in fastened composite joints.

The fastener system 100 (see FIGS. 3A-3C, 5B) may further comprise a removable plug device 94 (see FIG. 5B) configured for temporary insertion into the opening 40 (see FIG. 5B) of the feed channel 70 (see FIG. 5B) to prevent leakage of the resin filler 120 (see FIG. 5B) out of the fastener 10 (see FIG. 5B), after the resin filler 120 (see FIG. 5B) is injected into the feed channel 70 (see FIG. 5B) of the fastener 10 (see FIG. 5B), and before the resin filler 120 (see FIG. 5B) is cured in place.

Figure 4:
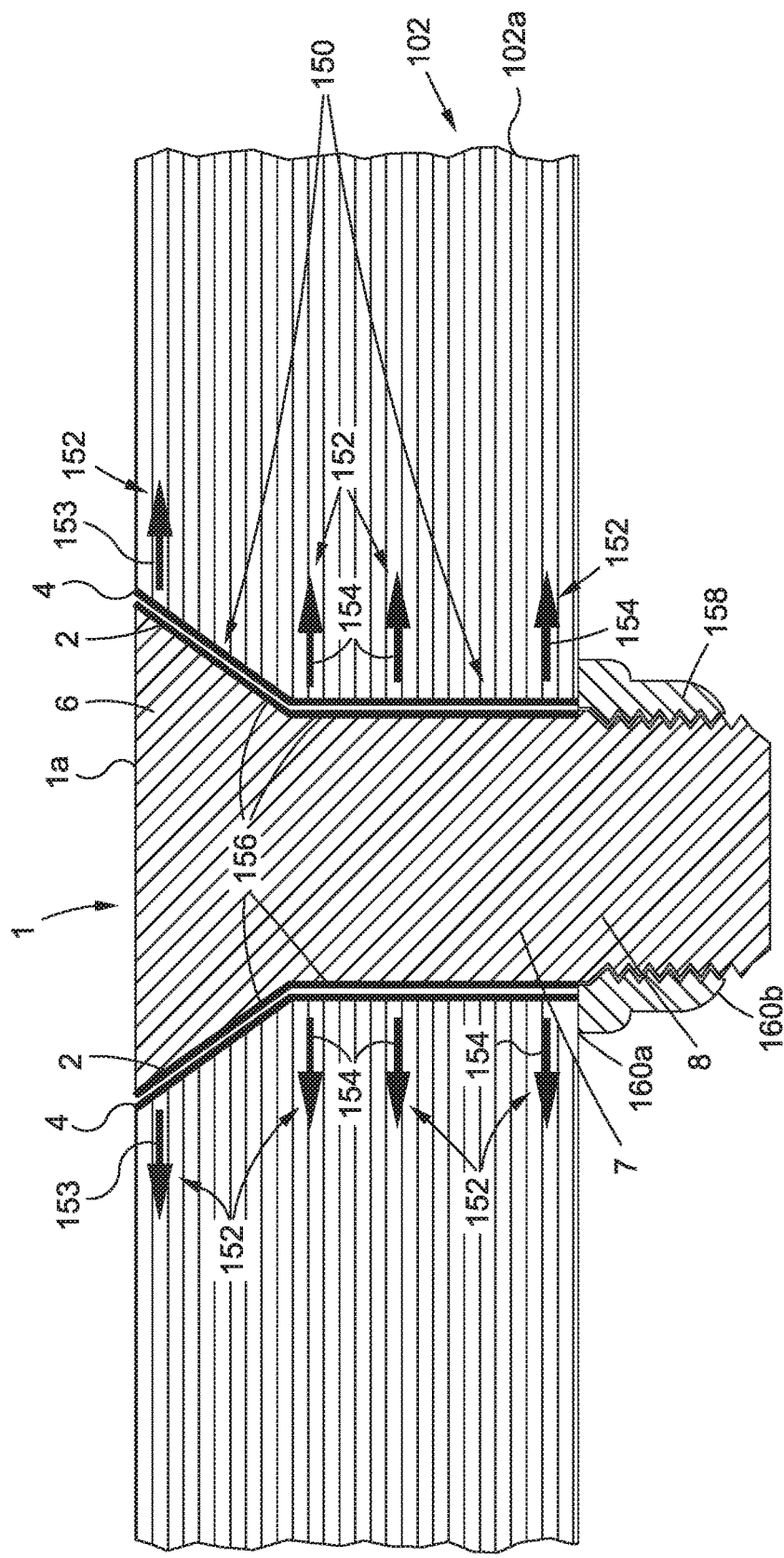
FIG. 4 is a schematic diagram of a sectional side view of a known sleeved fastener installed in a composite structure and showing distribution of electric current.

Now referring to FIG. 4, FIG. 4 is a schematic diagram of a sectional side view of a known sleeved fastener 1, such as in the form of an interference fit sleeved fastener 1a, installed in a composite structure 102, such as a carbon fiber reinforced plastic (CFRP) structure 102a. As shown in FIG. 4, the fastener 1 comprises a head portion 6, a shaft body 7, and a threaded portion 8. A sleeve 2 (see FIG. 4), such as a CRES (corrosion resistant steel) sleeve, surrounds the outside of the head portion 6 and the shaft body 7. A sealant 4 (see FIG. 4) is added over the sleeve 2 (see FIG. 4). As shown in FIG. 4, a threaded collar 158 having a first end 160a and a second end 160b is threaded around the threaded portion 8 of the fastener 1.

The fastener 1 (see FIG. 4) has an interference fit 150 (see FIG. 4) at the head portion 6 (see FIG. 4) and along the shaft body 7 (see FIG. 4). FIG. 4 shows a distribution of electric current 152, which includes a head portion electric current distribution 153 and a shaft body electric current distribution 154, and shows the electric current 152 being distributed or transferred along a full sleeve length 156 of the fastener 1. The distribution of electric current 152 (see FIG. 4) is uniform through the composite structure 102 (see FIG. 4), such as a carbon fiber reinforced plastic (CFRP) structure 102a (see FIG. 4), along the full sleeve length 156 (see FIG. 4) of the fastener 1 (see FIG. 4). The fastener 1 (see FIG. 4) is wet installed to ensure a fuel seal.

Now referring to FIG. 5A, FIG. 5A is a schematic diagram of a partial sectional side view of the fastener 10, such as in the form of fastener 10a, to further illustrate the fastener system 100, such as the fastener system 100a, of FIG. 3B of the disclosure. FIG. 5A shows the fastener 10, such as in the form of fastener 10a, installed in a composite structure 102, such as a carbon fiber reinforced plastic (CFRP) structure 102a, having a corresponding fastener hole 11 that may have a rough surface.

As shown in FIG. 5A, the composite structure 102, such as a carbon fiber reinforced plastic (CFRP) structure 102a, comprises the matrix material 104, such as the resin matrix 104a, mixed with the plurality of fibers 105, such as carbon fibers 105. The composite structure 102 (see FIGS. 5A, 7) preferably comprises an aircraft composite structure 102b (see FIG. 7). FIG. 5A further shows the resin filler 120 being injected into the fastener 10 to fill the interior 80 of the feed channel 70, such as the central feed channel 70a.

As further shown in FIG. 5A, the fastener 10, such as in the form of fastener 10a, comprises the head portion 22, the shaft body 20, and the threaded portion 42. The head portion 22 (see FIG. 5A) of the fastener 10 (see FIG. 5A) is in a countersink position 138 (see FIG. 5A) within the corresponding fastener hole 11 (see FIG. 5A) of the composite structure 102 (see FIG. 5A). As shown in FIG. 5A, when the fastener 10 is installed within the corresponding fastener hole 11, the plurality of ridges 82 on the shaft body 20 of the fastener 10 are adjacent and in direct contact with the inner hole surface 86 of the corresponding fastener hole 11. As shown in FIG. 5A, before the fastener 10 is filled with the resin filler 120 and before the fastener 10 undergoes radial expansion 162 (see FIG. 5B), the fastener 10 has a clearance fit 148.

As shown in FIG. 5A, a threaded collar 158 may preferably be coupled to the threaded portion 42 of the fastener 10 to tighten and help hold the fastener 10 in place within the corresponding fastener hole 11 in the composite structure 102. As further shown in FIG. 5A, the threaded collar 158 has a first end 160a adjacent the lower end of the composite structure 102 and has a second end 160b.

After the threaded collar 158 (see FIG. 5A) is coupled or attached to the fastener 10 (see FIG. 5A), and the fastener 10 (see FIG. 5A) is secured in place in the corresponding fastener hole 11 (see FIG. 5A), the resin filler 120 (see FIG. 5A) is preferably injected or deposited into the fastener 10 (see FIG. 5A) with the injection tool assembly 110 (see FIG. 5A).

As shown in FIG. 5A, the injection tool assembly 110 having a pressure injector 126 coupled to a vessel 118 containing the resin filler 120. As discussed above, the resin filler 120 (see FIG. 5A) comprises a resin material 122 (see FIG. 5B) mixed with, containing, or filled with a filler material 124 (see FIG. 5B) that may or may not be electrically conductive.

The injection tool assembly 110 (see FIG. 5A) may be provided with pressure and power by the pressure assembly 129, as shown in FIG. 3A, or another suitable power and pressure source or device. The pressure injector 126 (see FIG. 5A) and the vessel 118 (see FIG. 5A) may comprise similar components and a similar construction to the pressure injector 126 (see FIG. 3B) and the vessel 118 (see FIG. 3B) shown in FIG. 3B, or may comprise other suitable known pressure injector and vessel components used in known fluid pressure injection processes.

FIG. 5A shows an arrow indicating the flow path of the resin filler 120 into the fastener 10. The resin filler 120 (see FIG. 5A) flows, under pressure, via the injection tool assembly 110 (see FIG. 5A), into the fastener 10 (see FIG. 5A) through the opening 40 (see FIG. 5A) of the head portion 22 (see FIG. 5A) at the threaded portion 42 (see FIG. 5A), and proceeds to flow up into and through the feed channel 70 (see FIG. 5A), such as in the form of central feed channel 70a (see FIG. 5A), along a length 96 (see FIG. 5A) of the shaft body 20 (see FIG. 5A). Once an effective or desired amount of the resin filler 120 (see FIG. 5A) is injected or inserted into the fastener 10 (see FIG. 5A), the fastener 10 (see FIG. 5A) with the injected resin filler 120 (see FIG. 5A) may preferably be cured.

Now referring to FIG. 5B, FIG. 5B is a schematic diagram of a partial sectional side view of the fastener system 100 of FIG. 5A showing the fastener 10, such as in the form of fastener 10a, filled with the resin filler 120, and showing radial expansion 162 of the fastener 10 and distribution of electric current 152. FIG. 5B shows the fastener 10, such as in the form of fastener 10a, installed in the composite structure 102, such as the carbon fiber reinforced plastic (CFRP) structure 102a, having the corresponding fastener hole 11. As shown in FIG. 5B, the composite structure 102, such as the carbon fiber reinforced plastic (CFRP) structure 102a, comprises the matrix material 104, such as the resin matrix 104a, mixed with the plurality of fibers 105, such as carbon fibers 105. FIG. 5B further shows the feed channel 70, such as the central feed channel 70a, filled with the resin filler 120, comprising resin material 122 mixed with filler material 124.

As further shown in FIG. 5B, the fastener 10, such as in the form of fastener 10a, comprises the head portion 22, the shaft body 20, and the threaded portion 42. The head portion 22 (see FIG. 5B) of the fastener 10 (see FIG. 5B) is in the countersink position 138 (see FIG. 5B) within the corresponding fastener hole 11 (see FIG. 5B) of the composite structure 102 (see FIG. 5B). As shown in FIG. 5B, when the fastener 10 is installed within the corresponding fastener hole 11, the plurality of ridges 82 on the shaft body 20 of the fastener 10 are adjacent and in direct contact with the inner hole surface 86 of the corresponding fastener hole 11. Once the shaft body 20 (see FIG. 5B) radially expands, the plurality of ridges 82 (see FIG. 5B), such as dual function threads, formed along the outer surface 64 (see FIG. 1B) of the shaft body 20 (see FIG. 5B) may function or serve to provide an electrical interconnection 90 (see FIG. 5B) between the fastener 10 (see FIG. 5B) and the inner hole surface 86 (see FIG. 5B), and may also function or serve as a fuel seal 92 (see FIG. 5B), that is reliable, for the fastened joint 108 (see FIGS. 3A-3C).

As further shown in FIG. 5B, the threaded collar 158 having the first end 160a adjacent the lower end of the composite structure 102, and having the second end 160b, may preferably be coupled to the threaded portion 42 of the fastener 10 to tighten and help hold the fastener 10 in place within the corresponding fastener hole 11 in the composite structure 102.

As further shown in FIG. 5B, a removable plug device 94 may be temporarily inserted into the opening 40 of the feed channel 70 to prevent leakage of the resin filler 120 out of the fastener 10, after the resin filler 120 is injected into the feed channel 70 of the fastener 10. The removable plug device 94 (see FIG. 5B) may be removed after curing the fastener 10 (see FIG. 5B) and the resin filler 120 (see FIG. 5B), or the plug device 94 (see FIG. 5B) may remain attached to the fastener 10 (see FIG. 5B) after curing and removed at a later time. The opening 40 (see FIG. 5B) of the fastener 10 (see FIG. 5B) may be plugged, sealed, or closed with a removable plug device 94 (see FIG. 5B), or other suitable sealing element or device after injection of the resin filler 120 (see FIG. 5B), and either prior to, or after, cure. To increase the speed of production time, the removable plug device 94 (see FIG. 5B), may be inserted into the end of the feed channel 70 (see FIG. 5B) of the fastener 10 (see FIG. 5B) after the resin filler 120 (see FIG. 5B) has been injected, so that a production tool may be moved to a next site and no time is taken waiting for the resin material 122 (see FIG. 5B) of the resin filler 120 (see FIG. 5B) to cure.

FIG. 5B shows a distribution of electric current 152, which includes a head portion electric current distribution 153 and a shaft body electric current distribution 154, and shows the electric current 152 being distributed or transferred at the head portion 22 of the fastener 10 and along the length 96 the shaft body 20 of the fastener 10. The distribution of electric current 152 (see FIG. 5B), such as the shaft body electric current distribution 154 (see FIG. 5B), is preferably uniform along the length 96 (see FIG. 5B) of the shaft body 20 (see FIG. 5B) that is radially expanded or has undergone radial expansion 162 (see FIG. 5B). The radial expansion 162 (see FIG. 5B) provides electrical conductivity across the fastener-to-composite structure interface. The head portion electric current distribution 153 (see FIG. 5B) is preferably greater than the shaft body electric current distribution 154 (see FIG. 5B).

When the resin filler 120 (see FIG. 5B) is injected, under pressure, with the injection tool assembly 110 (see FIG. 5A), into the feed channel 70 (see FIG. 5B) of each fastener 10 (see FIG. 5B) to fill up the feed channel 70 (see FIG. 5B), it causes the shaft body 20 (see FIG. 5B), including the shaft body walls 168 (see FIG. 5B), to radially expand and to make direct physical contact and electrical contact 88 (see FIG. 5B) with the inner hole surface 86 (see FIG. 5B) of the corresponding fastener hole 11 (see FIG. 5B), and results in an expanded shaft body area 98. Once the fastener 10 (see FIG. 5B) is inserted into a drilled, corresponding fastener hole 11 (see FIG. 5B), the resin filler 120 (see FIG. 5B), such as comprising the resin material 122 (see FIG. 5B) with filler material 124 (see FIG. 5B), for example, chopped carbon fiber or an equivalent, may be injected into the feed channel 70 (see FIG. 5B) of the fastener 10 (see FIG. 5B), and may also serve or function as a structural reinforcement 164 (see FIG. 5B) for the fastened joint 108 (see FIGS. 3A-3C).

The radial expansion 162 (see FIG. 5B) of the fastener 10 (see FIG. 5B) provides improved electrical contact 88 (see FIG. 5B) with the composite structure 102 (see FIG. 5B) and provides improved distribution of electric current 152 (see FIG. 5B) to the composite structure 102 (see FIG. 5B). Each of the fasteners 10 (see FIG. 5B) comprises a compliant clearance fit fastener 12 (see FIGS. 1B, 2B), that when used with the resin filler 120 (see FIG. 5B), that causes the shaft body 20 (see FIG. 5B) to radially expand, provides an interference fit 150 (see FIG. 5B) at the head portion 22 (see FIG. 5B) and along the shaft body 20 (see FIG. 5B). Thus, the fastener 10 (see FIG. 5B) provides a lightning protection design 166 (see FIG. 5B) that is effective and increases the current carrying capacity of the fastened joint 108 (see FIGS. 3A-3C).

Figure 6:
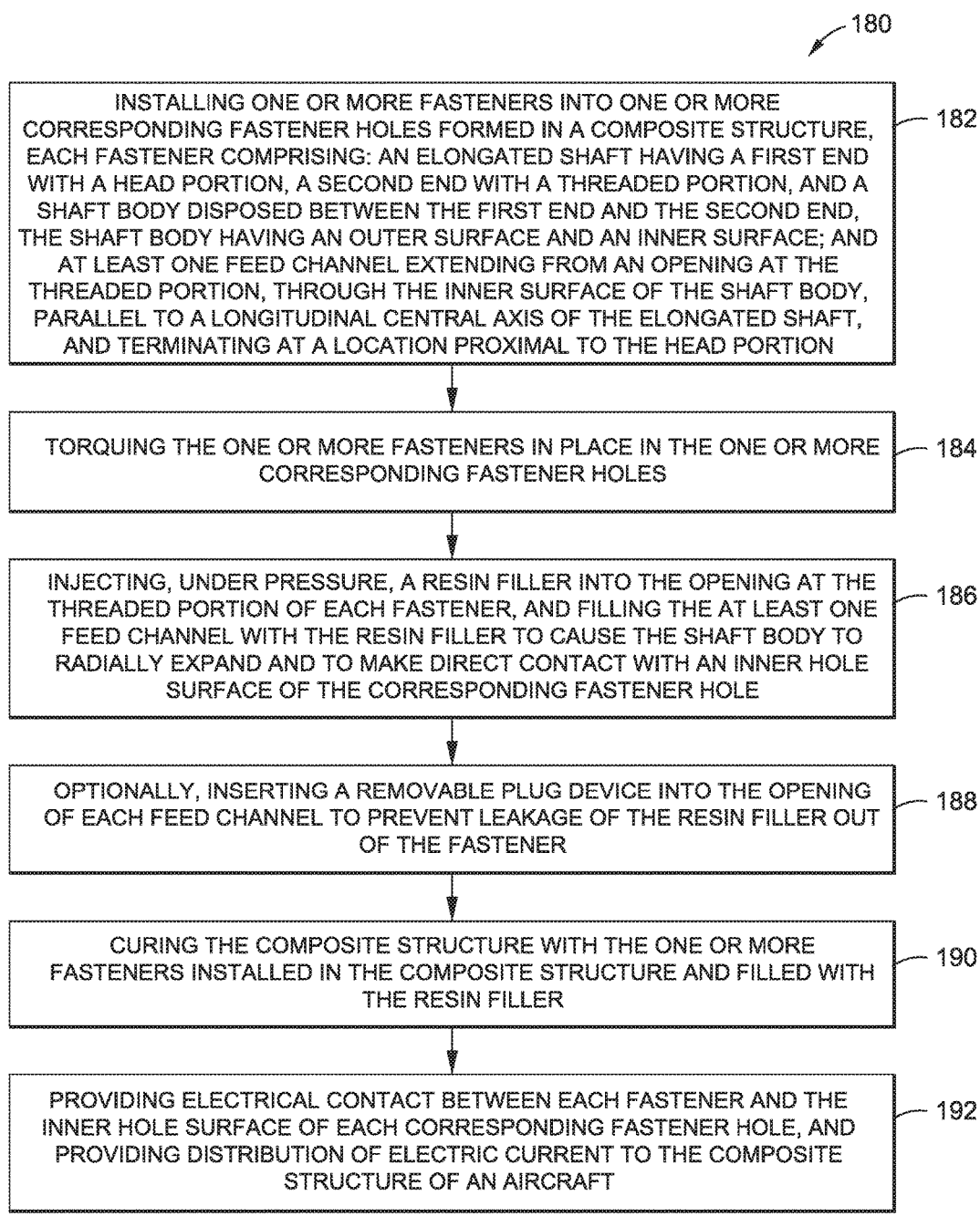
FIG. 6 is a flow diagram showing an example of a method of the disclosure.

Now referring to FIG. 6, in another example there is provided a method 180 for providing improved electrical contact 88 (see FIG. 5B) with a composite structure 102 (see FIG. 5B) of an aircraft 200a (see FIG. 7) and improved distribution of electric current 152 (see FIG. 5B) to the aircraft 200a (see FIG. 7), for example, electric current 152 (see FIG. 5B) from a lightning strike 170 (see FIG. 7) or other electromagnetic effects or electrical events. FIG. 6 is a flow diagram showing an example of the method 180 of the disclosure.

As shown in FIG. 6, the method 180 comprises step 182 of installing one or more fasteners 10 (see FIGS. 1A, 2A, 5A-5B), such as fastener 10a (see FIGS. 1A, 5A-5B), or fastener 10b (see FIG. 2A), into one or more corresponding fastener holes 11 (see FIGS. 3B, 3C, 5A-5B) formed in the composite structure 102 (see FIGS. 3B, 3C, 5A-5B). Before the fastener 10 (see FIGS. 1A, 2A, 5A-5B) is installed in the corresponding fastener hole 11 (see FIGS. 3B, 3C, 5A-5B), the corresponding fastener hole 11 (see FIGS. 3B, 3C, 5A-5B), such as in the form of a discrete through-hole, is preferably formed, such as by drilling or another suitable forming process, into the composite structure 102 (see FIGS. 3B, 3C, 5A-5B) with a known forming device, such as a drill or other suitable hole forming device. With the formation of the corresponding fastener hole 11 (see FIGS. 3B, 3C, 5A-5B) through the composite structure 102 (see FIGS. 3B, 3C, 5A-5B), the corresponding fastener hole 11 (see FIG. 5A) engages some of the total of the plurality of fibers 105 (see FIGS. 3B, 3C, 5A-5B), such as the carbon fibers 105a (see FIGS. 3B, 3C, 5A-5B), at an inner hole surface 86 (see FIGS. 5A-5B), which may be rough, of the corresponding fastener hole 11 (see FIGS. 5A-5B) of the composite structure 102 (see FIGS. 5A-5B).

Before the fastener 10 (see FIGS. 3B, 3C, 5A-5B) is installed in the corresponding fastener hole 11 (see FIGS. 3B, 3C, 5A-5B), which has been formed, the corresponding fastener hole 11 (see FIGS. 3B, 3C, 5A-5B) may be cleaned or prepared, if needed or desired, with a suitable cleaning or preparation device, cleaning or preparation agent, and/or cleaning or preparation method known in the art.

Once the corresponding fastener hole 11 (see FIGS. 3B, 3C, 5A-5B) has been cleaned or prepared, the fastener 10 (see FIGS. 3B, 3C, 5A-5B) is inserted or installed into the corresponding fastener hole 11 (see FIGS. 3B, 3C, 5A-5B). A threaded collar 158 (see FIGS. 5A-5B) may preferably be coupled to the threaded portion 42 (see FIGS. 5A-5B) of the fastener 10 (see FIGS. 5A-5B) to help hold the fastener 10 (see FIGS. 5A-5B) in place within the corresponding fastener hole 11 (see FIGS. 5A-5B) in the composite structure 102 (see FIGS. 5A-5B).

As discussed in detail above, each fastener 10 (see FIGS. 1A, 2A) comprises, as discussed above, an elongated shaft 14 (see FIGS. 1A, 2A) having a first end 16 (see FIGS. 1A, 2A) with a head portion 22 (see FIGS. 1A, 2A), a second end 18 (see FIGS. 1A, 2A) with a threaded portion 42 (see FIGS. 1A, 2A), and a shaft body 20 (see FIGS. 1A, 2A, 3A) disposed between the first end 16 (see FIGS. 1A, 2A) and the second end 18 (see FIGS. 1A, 2A). The shaft body 20 (see FIGS. 1A, 2A) has an outer surface 64 (see FIGS. 1A, 2A) and an inner surface 66 (see FIGS. 1B, 2B).

Each fastener 10 (see FIGS. 1A, 2A) further comprises, as discussed above, at least one feed channel 70 (see FIGS. 1B, 2B) extending from an opening 40 (see FIGS. 1B, 2B) at the threaded portion 42 (see FIGS. 1B, 2B), through the inner surface 66 (see FIGS. 1B, 2B) of the shaft body 20 (see FIGS. 1B, 2B), parallel to a longitudinal central axis 78 (see FIGS. 1B, 2B) of the elongated shaft 14 (see FIGS. 1B, 2B), and terminating at a location 76 (see FIGS. 1B, 2B) proximal to the head portion 22 (see FIGS. 1B, 2B).

In one example, the step 182 (see FIG. 6) of installing the one or more fasteners 10 (see FIGS. 1A, 2A) may comprise installing the one or more fasteners 10 (see FIGS. 1A, 2A), wherein the opening 40 (see FIGS. 1B, 2B) at the threaded portion 42 (see FIGS. 1B, 2B) comprises one of a slot opening 40a (see FIG. 1B) at a bottom end 46 (see FIG. 1B) of the threaded portion 42 (see FIG. 1B), and a concentric ring opening 40b (see FIG. 2B) at a top end 44 (see FIG. 2B) of the threaded portion 42 (see FIG. 2B), or another suitable type of opening.

As shown in FIG. 6, the method 180 further comprises step 184 of torquing the one or more fasteners 10 (see FIGS. 3B, 3C, 5A-5B) in place in the one or more corresponding fastener holes 11 (see FIGS. 3B, 3C, 5A-5B). After the fastener 10 (see FIGS. 3B, 3C, 5A-5B) is in place, the injection tool assembly 110 (see FIGS. 3A-3C, 5A) is preferably coupled to the threaded portion 42 (see FIGS. 3B, 3C, 5A) of the fastener 10 (see FIGS. 3B, 3C, 5A).

As shown in FIG. 6, the method 180 further comprises step 186 of injecting, under pressure, a resin filler 120 (see FIGS. 3B, 3C, 5A) into the opening 40 (see FIGS. 3B, 3C, 5A) at the threaded portion 42 (see FIGS. 3B, 3C, 5A) of each fastener 10 (see FIGS. 3B, 3C, 5A), and filling each feed channel 70 (see FIGS. 3B, 3C, 5A) with the resin filler 120 (see FIGS. 3B, 3C, 5A) to cause the shaft body 20 (see FIGS. 3B, 3C, 5A) to radially expand and to make direct contact with an inner hole surface 86 (see FIGS. 5A-5B) of the corresponding fastener hole 11 (see FIGS. 3B, 3C, 5A-5B). The resin filler 120 (see FIGS. 3B, 3C, 5A) is preferably injected or deposited into the fastener 10 (see FIGS. 3B, 3C, 5A) with the injection tool assembly 110 (see FIGS. 3B, 3C, 5A).

The step 186 (see FIG. 6) of injecting, under pressure, the resin filler 120 (see FIGS. 3B, 3C, 5A-5B) and filling the feed channel 70 (see FIGS. 3B, 3C, 5A-5B) with the resin filler 120 (see FIGS. 3B, 3C, 5A-5B) preferably comprises filling the feed channel 70 (see FIGS. 3B, 3C, 5A-5B) with the resin filler 120 (see FIGS. 3B, 3C, 5A-5B) to cause the shaft body 20 (see FIGS. 3B, 3C, 5A-5B) to radially expand at a radial expansion 162 (see FIG. 5B) of from about 0.001 inch to about 0.002 inch.

The step 186 (see FIG. 6) of injecting, under pressure, the resin filler 120 (see FIGS. 3B, 3C, 5A-5B) and filling each feed channel 70 (see FIGS. 3B, 3C, 5A-5B) with the resin filler 120 (see FIGS. 3B, 3C, 5A-5B) preferably comprises using an injection tool assembly 110 (see FIGS. 3B, 3C, 5A) to inject the resin filler 120 (see FIGS. 3B, 3C, 5A-5B) into the fastener 10 (see FIGS. 3B, 3C, 5A-5B).

As shown in FIGS. 3B, 3C, and 5A, the injection tool assembly 110 comprises a vessel 118 containing the resin filler 120. The vessel 118 (see FIGS. 3B, 3C, 5A) is preferably configured for coupling to the fastener 10 (see FIGS. 3B, 3C, 5A). As shown in FIGS. 3B, 3C, and 5A, the injection tool assembly 110 further comprises a pressure injector 126 coupled to the vessel 118, and the pressure injector 126 is preferably configured to couple to the opening 40 at the threaded portion 42 of the fastener 10, such as fastener 10a (see FIGS. 1A, 5A), and fastener 10b (see FIG. 2A). The vessel 118 (see FIGS. 3B, 3C, 5A) may also be configured to couple to the opening 40 (see FIGS. 3B, 3C, 5A). The pressure injector 126 (see FIGS. 3B, 3C, 5A) is preferably configured to inject the resin filler 120 (see FIGS. 3B, 3C, 5A), under pressure, into the fastener 10 (see FIGS. 3B, 3C, 5A).

The step 186 (see FIG. 6) of injecting, under pressure, the resin filler 120 (see FIGS. 5A-5B), further comprises injecting the resin filler 120 (see FIGS. 5A-5B) comprising a resin material 122 (see FIG. 5B) mixed with a filler material 124 (see FIG. 5B) that may or may not be electrically conductive. As shown in FIG. 5B, the resin filler 120 comprises the resin material 122 mixed with the filler material 124. As discussed above, exemplary resin materials 122 (see FIG. 5B), or binding resin materials or resin systems, for the resin filler 120 (see FIG. 5B) may comprise epoxy resins, bismaleimide (BMI) resins, phenolic resins, and cyanate ester resins, and exemplary filler materials 124 (see FIG. 5B) for the resin filler 120 (see FIG. 5B) may comprise carbon nanotubes, chopped carbon fibers, silver particles, and the conductive polymer poly(3,4-ethylenedioxythiophene) polystyrene sulfonate (PEDOT/PSS). Exemplary resin fillers 120 (see FIGS. 5A-5B) comprise an epoxy resin doped with silver particles; a bismaleimide (BMI) resin doped with silver particles; a phenolic resin doped with silver particles; a cyanate ester resin doped with silver particles; an epoxy resin doped with carbon nanotubes; a bismaleimide (BMI) resin doped with carbon nanotubes; a phenolic resin doped with carbon nanotubes; a cyanate ester resin doped with carbon nanotubes; an epoxy resin with chopped carbon fibers; a bismaleimide (BMI) resin with chopped carbon fibers; a phenolic resin with chopped carbon fibers; a cyanate ester resin with chopped carbon fibers; and a resin with poly(3,4-ethylenedioxythiophene) polystyrene sulfonate (PEDOT/PSS).

The step 186 (see FIG. 6) of injecting, under pressure, the resin filler 120 (see FIGS. 5A-5B), further comprises selecting the resin filler 120 (see FIGS. 5A-5B), so that a coefficient of thermal expansion (CTE) of the resin filler 120 (see FIGS. 5A-5B) substantially matches a coefficient of thermal expansion (CTE) of the fastener 10 (see FIGS. 5A-5B). Further, in addition to similar CTEs and expansion characteristics, preferably, the resin material 122 (see FIG. 5B), or binding resin material or resin system, of the resin filler 120 (see FIG. 5B) has similar chemical properties and similar structural properties as the materials that make up the fastener 10 (see FIGS. 1A, 2A, 2E, 5A-5B).

As shown in FIG. 6, the method 180 may further optionally comprise, after the step 186 of injecting the resin filler 120 (see FIGS. 5A-5B) into the fastener 10 (see FIGS. 5A-5B), the step 188 of inserting a removable plug device 94 (see FIG. 5B) into the opening 40 (see FIG. 5B) of each feed channel 70 (see FIG. 5B) of the fastener 10 (see FIG. 5B), to prevent leakage of the resin filler 120 (see FIG. 5B) out of the fastener 10 (see FIG. 5B). The removable plug device 94 (see FIG. 5B) may be removed after curing the fastener 10 (see FIG. 5B) and the resin filler 120 (see FIG. 5B), or the removable plug device 94 may remain attached to the fastener 10 (see FIG. 5B) after curing.

As shown in FIG. 6, the method 180 further comprises step 190 of curing the composite structure 102 (see FIG. 5B) with the one or more fasteners 10 (see FIG. 5B) installed in the composite structure 102 (see FIG. 5B) and filled with the resin filler 120 (see FIG. 5B). Once an effective or desired amount of the resin filler 120 (see FIG. 5A) is injected or inserted into the fastener 10 (see FIG. 5A), the fastener 10 (see FIG. 5A) with the injected resin filler 120 (see FIG. 5A) is preferably cured. The curing step 190 may be performed using a known curing process, such as an autoclave curing process, a vacuum bag curing process, a combination autoclave and vacuum bagging curing process, a compression mold curing process, a resin transfer molding process, a room temperature curing process, or another suitable curing process. The curing may take place at an elevated, effective temperature or effective heat and/or effective pressure for an effective period of time, as required per material specifications to effectively cure a chosen resin filler 120 (see FIG. 5A). During curing, the resin filler 120 (see FIG. 5A) hardens, where deposited, in the fastener 10 (see FIG. 5A). The curing temperature or heat and/or pressure needed depends on the type of resin filler 120 (see FIG. 5A) chosen to be injected into the fastener 10 (see FIG. 5A), and may thus vary. As used herein, "curing" means undergoing a full or partial hardening process, with or without heat, and includes precuring or precured resins.

Figure 7:
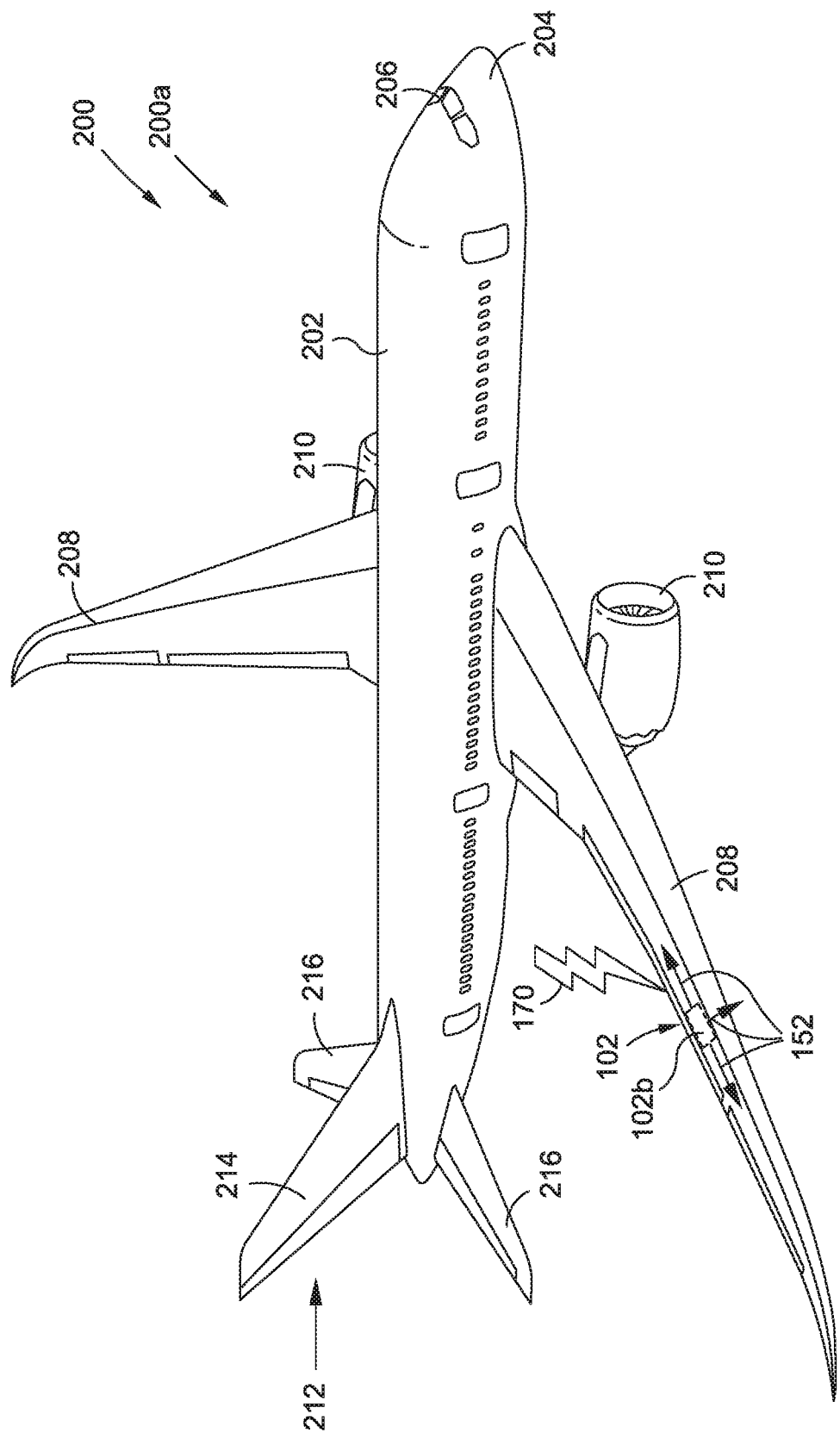
FIG. 7 is an illustration of a perspective view of an aircraft that may incorporate composite structures having one or more examples of a fastener of the disclosure.

As shown in FIG. 6, the method 180 further comprises step 192 of providing electrical contact 88 (see FIG. 5B) between each fastener 10 (see FIG. 5B), such as fastener 10a (see FIGS. 1A, 5B), and fastener 10b (see FIG. 2A), and the inner hole surface 86 (see FIG. 5B) of each corresponding fastener hole 11 (see FIG. 5B), and providing distribution of the electric current 152 (see FIG. 5B) such as resulting from the lightning strike 170 (see FIG. 7) to the aircraft 200a (see FIG. 7).

The step 192 of providing electrical contact 88 (see FIG. 5B) and providing distribution of the electric current 152 (see FIG. 5B) comprises distributing a head portion electric current distribution 153 (see FIG. 5B) and a shaft body electric current distribution 154 (see FIG. 5B). As shown in FIG. 5B, the shaft body electric current distribution 154 is uniform along a length 96 of the shaft body 20 that is radially expanded, for example, undergone a radial expansion 162, and the head portion electric current distribution 153 is greater than the shaft body electric current distribution 154. After the fastener 10 (see FIG. 5B) is expanded with the resin filler 120 (see FIG. 5B), the fastener 10 (see FIG. 5B) preferably has an interference fit 150 (see FIG. 5B) at the head portion 22 with the composite structure 102 (see FIG. 5B), and an interference fit 150 (see FIG. 5B) through the shaft body 20 (see FIG. 5B), with the composite structure 102 (see FIG. 5B).

Now referring to FIG. 7, FIG. 7 is an illustration of a perspective view of an air vehicle 200, such as an aircraft 200a, that may incorporate one or more composite structures 102, such as, for example, one or more aircraft composite structures 102b, having examples of the fasteners 10 (see FIGS. 1A, 2A) of the disclosure. Preferably, the composite structures 102 (see FIG. 7) comprise carbon fiber reinforced plastic (CFRP) structures 102a (see FIGS. 3A-3C, 5A-5B). As shown in FIG. 7, the aircraft 200a comprises such components as a fuselage 202, a nose 204, a flight deck 206, wings 208, one or more propulsion units 210 or engines, and a tail 212 comprising a vertical stabilizer 214 and horizontal stabilizers 216.

Although the air vehicle 200, such as aircraft 200a, shown in FIG. 7 is generally representative of a commercial passenger aircraft having one or more composite structures 102, the teachings of the disclosed examples may be applied to other passenger aircraft. For example, the teachings of the disclosed examples may be applied to cargo aircraft, military aircraft, rotorcraft, and other types of aircraft or aerial vehicles, as well as aerospace vehicles, satellites, space launch vehicles, rockets, and other aerospace vehicles.

Figure 8:
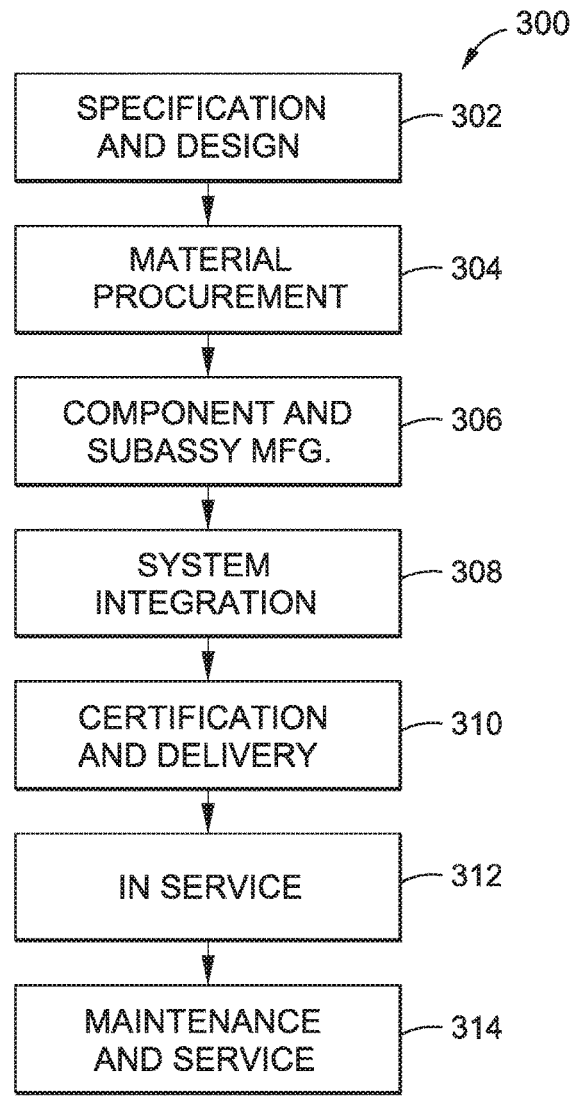
FIG. 8 is a flow diagram of an aircraft manufacturing and service method.
Figure 9:
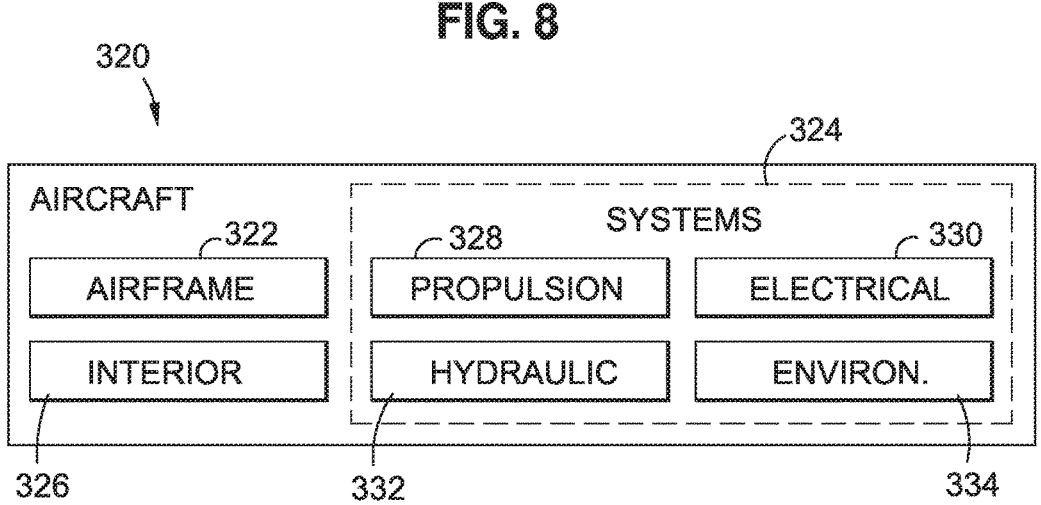
FIG. 9 is a block diagram of an aircraft.

Now referring to FIGS. 8-9, FIG. 8 is a flow diagram of an aircraft manufacturing and service method 300. FIG. 9 is a block diagram of an aircraft 320. Referring to FIGS. 8-9, examples of the disclosure may be described in the context of the aircraft manufacturing and service method 300 as shown in FIG. 8, and the aircraft 320 as shown in FIG. 9.

As shown in FIG. 8, during pre-production, exemplary aircraft manufacturing and service method 300 may include specification and design 302 of the aircraft 320 (see FIG. 9) and material procurement 304. During manufacturing, component and subassembly manufacturing 306 (see FIG. 8) and system integration 308 (see FIG. 8) of the aircraft 320 (see FIG. 9) takes place. Thereafter, the aircraft 320 (see FIG. 9) may go through certification and delivery 310 (see FIG. 8) in order to be placed in service 312 (see FIG. 8). While in service 312 (see FIG. 8) by a customer, the aircraft 320 (see FIG. 9) may be scheduled for routine maintenance and service 314 (see FIG. 8) which may also include modification, reconfiguration, refurbishment, and other suitable services.

Each of the processes of the aircraft manufacturing and service method 300 (see FIG. 8) may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 9, the aircraft 320 produced by the exemplary aircraft manufacturing and service method 300 (see FIG. 8) may include an airframe 322 with a plurality of systems 324 and an interior 326. As further shown in FIG. 9, examples of the plurality of systems 324 may include one or more of a propulsion system 328, an electrical system 330, a hydraulic system 332, and an environmental system 334. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300 (see FIG. 8). For example, components or subassemblies corresponding to component and subassembly manufacturing 306 (see FIG. 8) may be fabricated or manufactured in a manner similar to components or subassemblies produced while the aircraft 320 (see FIG. 9) is in service 312 (see FIG. 8). Also, one or more apparatus examples, method examples, or a combination thereof, may be utilized during component and subassembly manufacturing 306 (see FIG. 8) and system integration 308 (see FIG. 8), for example, by substantially expediting assembly of or reducing the cost of the aircraft 320 (see FIG. 9). Similarly, one or more of apparatus examples, method examples, or a combination thereof, may be utilized while the aircraft 320 (see FIG. 9) is in service 312 (see FIG. 8), for example and without limitation, to maintenance and service 314 (see FIG. 8).

Disclosed examples of the fastener 10 (see FIGS. 1A, 2A, 2E), the fastener system 100 (see FIGS. 3A-3C, 5A-5B), and the method 180 (see FIG. 6) provide a compliant clearance fit fastener 12 (see FIGS. 1A, 2A) that is expandable and resin filled. The fastener 10 (see FIGS. 1A, 2A, 2E) has a feed channel 70 (see FIGS. 1B, 2B, 5B), such as in the form of a central feed channel 70a (see FIGS. 1B, 5B), and such as in the form of a concentric ring feed channel 70b (see FIGS. 2B, 2E), configured to receive a resin filler 120 (see FIGS. 5A-5B) within the feed channel 70 (see FIGS. 1B, 2B, 2E, 5B). The feed channel 70 (see FIGS. 1B, 2B, 2E, 5B) has an interior 80 (see FIGS. 1B, 2B) that is hollow and that is designed to radially expand, once it is inserted into a corresponding fastener hole 11 (see FIGS. 3B, 3C, 5A-5B) and filled with a resin filler 120 (see FIG. 5B) that forces or causes radial expansion 162 (see FIG. 5B) of the shaft body 20 (see FIGS. 1B, 2B, 5B) of the fastener 10 (see FIGS. 1B, 2B, 5B), and enables direct physical contact and improved electrical contact 88 (see FIG. 5B) between the fastener 10 (see FIGS. 1B, 2B, 5B) and the inner hole surface 86 (see FIG. 5B) of the corresponding fastener hole 11 (see FIG. 5B).

The resin filler 120 (see FIG. 5B) also serves or functions as a structural reinforcement 164 (see FIG. 5B) for the fastened joint 108 (see FIGS. 3A-3C), and the resin filler 120 (see FIG. 5B) does not necessarily need to have electrical conductivity characteristics, since electrical conduction may be primarily achieved through the shaft body walls 168 (see FIG. 5B) of the fastener 10 (see FIG. 5B). The compliant clearance fit fastener 12 (see FIGS. 1B, 2B) is preferably configured for installation with a clearance fit 148 (see FIG. 5A) in a corresponding fastener hole 11 (see FIG. 5A), thus mitigating the need for high cost, known sleeved fasteners 1 (see FIG. 4), while also enabling improved efficiency in the assembly process. Thus, the shaft body 20 (see FIG. 5B) of the fastener 10 (see FIG. 5B) is expandable and is configured to radially expand upon being filled with the resin filler 120 (see FIG. 5B) that also provides structural reinforcement 164 (see FIG. 5B). The type of resin filler 120 (see FIG. 5B) used may be determined based on the design and intended applications of the fastener 10 (see FIGS. 1A, 2A) and fastener system 100 (see FIGS. 3A-3C, 5A-5B) used.

In addition, disclosed examples of the fastener 10 (see FIGS. 1A, 2A, 2E), the fastener system 100 (see FIGS. 3A-3C, 5A-5B), and the method 180 (see FIG. 6) provide a lightning protection design 166 (see FIG. 5B), where the fastener 10 (see FIGS. 1A, 2A, 2E) does not require a sleeve 2 (see FIG. 4) and a sealant 4 (see FIG. 4), as compared to known sleeved fasteners 1 (see FIG. 4). The fastener 10 (see FIGS. 1A, 2A), the fastener system 100 (see FIGS. 3A-3C, 5A-5B), and the method 180 (see FIG. 6) may solve the high cost fastener issue associated with known sleeved fasteners 1 (see FIG. 4) and the need for fastened joints having an interference fit 150 (see FIG. 4) that may be required for the lightning protection design of composite structures, such as composite fuel tanks for aircraft. Further, the fastener 10 (see FIGS. 1A, 2A, 2E), the fastener system 100 (see FIGS. 3A-3C, 5A-5B), and the method 180 (see FIG. 6) enable a fastened joint 108 (see FIGS. 3A-3C) with an interference fit 150 (see FIG. 5B) along the length 96 (see FIG. 5B) of the shaft body 20 (see FIG. 5B), and an interference fit 150 (see FIG. 5B) at the head portion 22 (see FIG. 5B), and may also allow for application of a reduced cost, more robust aircraft assembly approach such as a full size to full size assembly. Thus, the fastener 10 (see FIGS. 1B, 2B, 2E, 5B) is expandable and provides electrical current transfer at the head portion 22 (see FIG. 5B) and along the shaft body 20 (see FIG. 5B) or shank, once expanded after insertion into the drilled corresponding fastener hole 11 (see FIG. 5B) and filled with the resin filler 120 (see FIG. 5B). The fastener 10 (see FIGS. 1A, 2A, 2E, 5B) is preferably an inexpensive, sleeveless, expandable, compliant clearance fit fastener 12 (see FIGS. 1A, 2A) that is used in conjunction with the resin filler 120 (see FIG. 5B) to yield the equivalent, or better, electrical conductivity and electrical contact 88 (see FIG. 5B), as compared to that of known interference fit sleeved fasteners 1a (see FIG. 4).

Moreover, disclosed examples of the fastener 10 (see FIGS. 1A, 2A, 2E), the fastener system 100 (see FIGS. 3A-3C, 5A-5B), and the method 180 (see FIG. 6) may provide for a reduced overall weight of an air vehicle 200 (see FIG. 7), such as an aircraft 200a (see FIG. 7), by decreasing the use of heavy electrically insulating sealants on the fasteners, for example, as used in aircraft fuel tanks, for protection against lightning strikes 170 (see FIG. 7) or other electromagnetic effects or electrical events, by decreasing the use of known sleeved fasteners 1 (see FIG. 4), such as interference fit sleeved fasteners 1a (see FIG. 4) that may add weight, and by decreasing the use of numerous fastener cap seals on fasteners that may add weight. Further, the fastener 10 (see FIGS. 1A, 2A, 2E), the fastener system 100 (see FIGS. 3A-3C, 5A-5B), and the method 180 (see FIG. 6) may reduce the cost of lightning mitigation on composite structures 102 (see FIG. 7) of aircraft 200a (see FIG. 7) by employing the less expensive fasteners 10 (see FIGS. 1A, 2A, 2E) disclosed herein that provide equivalent or better electrical connection to composite structures 102 (see FIGS. 3A-3C, 7), such as aircraft composite wing skins.

The cost of secondary sealants and fastener cap seals may also be reduced with the disclosed fasteners 10 (see FIGS. 1A, 2A, 2E) and fastener system 100 (see FIGS. 3A-3C). In contrast to known sleeved fasteners 1 (see FIG. 4) that use a sealant 4 (see FIG. 4), for example, a polysulfide resin, during assembly for fuel seal purposes, the fastener 10 (see FIGS. 1B, 2B) does not use a sleeve 2 (see FIG. 4) or a sealant 4 (see FIG. 4), and uses a resin filler 120 (see FIGS. 5A-5B) to fill the feed channel 70 (see FIGS. 1B, 2B, 2E, 5B) of the fastener 10 (see FIGS. 1B, 2B, 2E, 5B) to radially expand the shaft body walls 168 (see FIG. 5B) to enable electrical and physical contact between the fastener 10 (see FIGS. 1B, 2B, 2E, 5B) and the inner hole surface 86 (see FIG. 5B) of the corresponding fastener hole 11 (see FIG. 5B).

The fastener 10 (see FIGS. 1A, 2A, 2E) provides for a fastener having a reduced cost and a reduced weight that may be used in composite structures 102 (see FIG. 4), such as composite fuel tanks of aircraft 200a (see FIG. 7) to achieve good electrical contact 88 (see FIG. 5B) between the fastener 10 (see FIG. 5B) and the composite structure 102 (see FIG. 5B), for example, a fastener-to-composite structure interface, thus increasing the current carrying capacity of the fastened joint 108 (see FIGS. 3A-3C) formed by the fastener 10 (see FIG. 5B) fastened to the composite structure 102 (see FIG. 5B). For lightning protection of carbon fiber reinforced plastic (CFRP) structures 102a (see FIGS. 3A-3C, 5A-5B) with fastened joints 108 (see FIGS. 3B, 3C), it is desirable to increase the lightning current carrying capacity of the fastened joints 108 (see FIGS. 3B, 3C) by providing surface electrical contact area along the length 96 (see FIGS. 5A-5B) of the fastener 10 (see FIGS. 5A-5B) and the inner hole surface 86 (see FIG. 5B) of the corresponding fastener hole 11 (see FIG. 5B), through which the fastener 10, such as a metal fastener, is inserted into the composite structure 102 (see FIG. 5B).

The compliant clearance fit fastener 12 (see FIGS. 1A, 2A, 2E) may be used on wings 208 (see FIG. 7) of an aircraft 200a (see FIG. 7), and the radial expansion 162 (see FIG. 5B) increases distribution of electric current 152 (see FIG. 5B) through increased electrical contact 88 (see FIG. 5B) between the shaft body 20 (see FIG. 5B) of the fastener 10 (see FIG. 5B) and the composite structure 102 (see FIG. 5B), such as the CFRP structure 102a (see FIG. 5B) or CFRP layup, during a lightning strike 170 (see FIG. 6). Increased current distribution increases EME (electromagnetic effect) characteristics.

Further, disclosed examples of the fastener 10 (see FIGS. 1A, 2A, 2E), the fastener system 100 (see FIGS. 3A-3C, 5A-5B), and the method 180 (see FIG. 6), provide a fastener 10 (see FIG. 1B) having a shaft body 20 (see FIG. 1B) with an outer surface 64 (see FIG. 1B), such as in the form of a ridged outer surface 64a (see FIG. 1B) having a plurality of ridges 82 (see FIG. 1B), configured to contact the inner hole surface 86 (see FIG. 5B) of a corresponding fastener hole 11 (see FIG. 5B), to provide an electrical interconnection 90 (see FIG. 5B) with a composite structure 102 (see FIG. 5B). After radial expansion 162 (see FIG. 5B), the plurality of ridges 82 (see FIGS. 1B, 5B) also provide a fuel seal 92 (see FIG. 5B) for a fastened joint 108 (see FIGS. 3A-3C) formed by the fastener 10 (see FIGS. 3B, 3C, 5B) fastened to the composite structure 102 (see FIGS. 3B, 3C, 5B). Thus, the plurality of ridges 82 (see FIG. 1B) along the shaft body 20 (see FIG. 1B) may improve current distribution and may serve as an integral fuel seal once the shaft body 20 (see FIG. 5B) is expanded.

Many modifications and other examples of the disclosure will come to mind to one skilled in the art to which this disclosure pertains having the benefit of the teachings presented in the foregoing descriptions and the associated drawings. The examples described herein are meant to be illustrative and are not intended to be limiting or exhaustive. Although specific terms are employed herein, they are used in a generic and descriptive sense only and not for purposes of limitation.

What is claimed is:

1. A fastener for providing improved electrical contact with a composite structure and improved distribution of electric current to the composite structure, the fastener comprising:
   an elongated shaft having a first end, a second end, and a shaft body disposed between the first end and the second end, the shaft body having an outer surface and an inner surface;
   a head portion disposed at the first end;
   a threaded portion disposed at the second end; and
   at least one feed channel extending from an opening at the threaded portion, through the inner surface of the shaft body, parallel to a longitudinal central axis of the elongated shaft, and terminating at a location proximal to the head portion;
   wherein the shaft body is configured to radially expand upon injection, under pressure, of a resin filler into the at least one feed channel, when the fastener is installed in a corresponding fastener hole formed in the composite structure, and further wherein upon radially expanding, the outer surface of the shaft body is configured to make direct contact with an inner hole surface of the corresponding fastener hole, resulting in the fastener providing electrical contact with the composite structure and providing distribution of electric current to the composite structure.

2. The fastener of claim 1 wherein the opening at the threaded portion comprises a slot opening at a bottom end of the threaded portion, and the feed channel comprises a central feed channel.

3. The fastener of claim 1 wherein the opening at the threaded portion comprises a concentric ring opening at a top end of the threaded portion, and the feed channel comprises a concentric ring feed channel.

4. The fastener of claim 3 wherein the shaft body further comprises one or more longitudinal grooves extending from the concentric ring opening at the top end of the threaded portion, through the outer surface of the shaft body, parallel to the longitudinal central axis of the elongated shaft, and terminating proximal to the head portion.

5. The fastener of claim 1 wherein the outer surface of the shaft body comprises a plurality of ridges configured to contact the inner hole surface of the corresponding fastener hole to provide electrical interconnection with the composite structure and to provide a fuel seal for a fastened joint formed by the fastener fastened to the composite structure.

6. The fastener of claim 1 wherein the fastener comprises a compliant clearance fit fastener, that when used with the resin filler that causes the shaft body to radially expand, results in a distribution of electric current comprising a head portion electric current distribution and a shaft body electric current distribution.

7. A fastener system for providing improved electrical contact with a composite structure and improved distribution of electric current to the composite structure, the fastener system comprising:
   one or more fasteners configured for installation in one or more corresponding fastener holes formed in the composite structure, each fastener comprising:
      an elongated shaft having a first end, a second end, and a shaft body disposed between the first end and the second end, the shaft body having an outer surface and an inner surface;
      a head portion disposed at the first end;
      a threaded portion disposed at the second end; and
      at least one feed channel extending from an opening at the threaded portion, through the inner surface of the shaft body, parallel to a longitudinal central axis of the elongated shaft, and terminating at a location proximal to the head portion;
   an injection tool assembly configured for coupling to each of the one or more fasteners installed in the one or more corresponding fastener holes; and
   a resin filler injected, under pressure, with the injection tool assembly into the at least one feed channel of each fastener to fill up the at least one feed channel to cause the shaft body to radially expand and to make direct contact with an inner hole surface of the corresponding fastener hole, resulting in the fastener providing electrical contact with the composite structure and providing distribution of electric current to the composite structure.

8. The system of claim 7 further comprising a removable plug device configured for insertion into the opening of the at least one feed channel to prevent leakage of the resin filler out of the fastener, after the resin filler is injected into the at least one feed channel of the fastener.

9. The system of claim 7 wherein the opening at the threaded portion comprises a slot opening at a bottom end of the threaded portion, and the feed channel comprises a central feed channel.

10. The system of claim 7 wherein the opening at the threaded portion comprises a concentric ring opening at a top end of the threaded portion, and the feed channel comprises a concentric ring feed channel.

11. The system of claim 7 wherein the injection tool assembly comprises a vessel containing the resin filler, the vessel configured for coupling, via an attachment portion, to the opening at the threaded portion of the fastener, and wherein the injection tool assembly further comprises a pressure injector coupled to the vessel and to the opening at the threaded portion of the fastener, the pressure injector configured to inject the resin filler, under pressure, into the fastener.

12. The system of claim 7 wherein the resin filler is selected so that a coefficient of thermal expansion of the resin filler substantially matches a coefficient of thermal expansion of the fastener.

13. The system of claim 7 wherein the distribution of the electric current comprises a head portion electric current distribution and a shaft body electric current distribution, the shaft body electric current distribution being uniform along a length of the shaft body that is radially expanded, and the head portion electric current distribution being greater than the shaft body electric current distribution.

14. The system of claim 7 wherein the composite structure comprises an aircraft composite structure, and wherein each of the one or more fasteners comprises a compliant clearance fit fastener, that when used with the resin filler that causes the shaft body to radially expand, results in the head portion and the shaft body both having an interference fit with the inner hole surface of the corresponding fastener hole.

15. A method for providing improved electrical contact with a composite structure of an aircraft and improved distribution of electric current to the aircraft, the method comprising the steps of:
- installing one or more fasteners into one or more corresponding fastener holes formed in the composite structure, each fastener comprising:
  - an elongated shaft having a first end with a head portion, a second end with a threaded portion, and a shaft body disposed between the first end and the second end, the shaft body having an outer surface and an inner surface; and
  - at least one feed channel extending from an opening at the threaded portion, through the inner surface of the shaft body, parallel to a longitudinal central axis of the elongated shaft, and terminating at a location proximal to the head portion;
- torquing the one or more fasteners in place in the one or more corresponding fastener holes;
- injecting, under pressure, a resin filler into the opening at the threaded portion of each fastener, and filling the at least one feed channel with the resin filler to cause the shaft body to radially expand and to make direct contact with an inner hole surface of the corresponding fastener hole;
- curing the composite structure with the one or more fasteners installed in the composite structure and filled with the resin filler; and
- providing electrical contact between each fastener and the inner hole surface of each corresponding fastener hole, and providing distribution of the electric current to the aircraft.

16. The method of claim 15 further comprising after injecting the resin filler into the fastener, inserting a removable plug device into the opening of each feed channel to prevent leakage of the resin filler out of the fastener.

17. The method of claim 15 wherein the installing the one or more fasteners comprises installing the one or more fasteners, wherein the at least one feed channel comprises one of, a central feed channel, and a concentric ring feed channel.

18. The method of claim 15 wherein injecting and filling with the resin filler comprises using an injection tool assembly to inject the resin filler into the fastener, the resin filler comprising a resin material mixed with a filler material that is electrically conductive, the injection tool assembly comprising a vessel containing the resin filler, the vessel configured for coupling to the fastener, and wherein the injection tool assembly further comprises a pressure injector coupled to the vessel and configured to couple to the opening at the threaded portion of the fastener, the pressure injector configured to inject the resin filler, under pressure, into the fastener.

19. The method of claim 15 wherein injecting and filling with the resin filler comprises filling the at least one feed channel with the resin filler to cause the shaft body to radially expand at a radial expansion of from about 0.001 inch to about 0.002 inch.

20. The method of claim 15 wherein providing electrical contact and providing distribution of the electric current comprises distributing a head portion electric current distribution and a shaft body electric current distribution, the shaft body electric current distribution being uniform along a length of the shaft body that is radially expanded, and the head portion electric current distribution being greater than the shaft body electric current distribution.

* * * * *